United States Patent
Laudermilch et al.

(10) Patent No.: US 8,750,108 B2
(45) Date of Patent: Jun. 10, 2014

(54) SYSTEM AND METHOD FOR CONTROLLING MOBILE DEVICE ACCESS TO A NETWORK

(75) Inventors: Norm Laudermilch, Herndon, VA (US); William Supernor, Dunn Loring, VA (US); Roman Boroday, Reston, VA (US); David Goldschlag, Silver Spring, MD (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/459,213

(22) Filed: Apr. 29, 2012

(65) Prior Publication Data

US 2012/0270522 A1    Oct. 25, 2012

Related U.S. Application Data

(63) Continuation of application No. 11/877,656, filed on Oct. 23, 2007, now Pat. No. 8,259,568.

(60) Provisional application No. 60/853,460, filed on Oct. 23, 2006.

(51) Int. Cl.
    *H04L 12/26*     (2006.01)
    *H04L 1/00*      (2006.01)
    *H04J 3/14*      (2006.01)
    *G06F 15/173*    (2006.01)

(52) U.S. Cl.
    USPC ........ 370/230; 370/229; 370/395.2; 370/464; 709/225

(58) Field of Classification Search
    CPC ....... H04L 63/00; H04L 63/10; H04L 63/101; H04L 63/102; H04L 63/104; H04L 63/105; H04L 63/107; H04L 63/108
    USPC ......... 709/203, 217, 220, 223, 224, 226, 229; 455/3.01, 411, 412.1, 414.1, 418, 419, 455/422.1, 423, 424, 425, 426.2, 432, 435, 455/456, 456.3, 502, 507, 556.1; 370/230, 370/328, 329, 338, 395.21, 401, 423
    See application file for complete search history.

(56) References Cited

U.S. PATENT DOCUMENTS

| | | | |
|---|---|---|---|
| 5,727,202 A | 3/1998 | Kucala | |
| 5,884,323 A | 3/1999 | Hawkins et al. | |

(Continued)

FOREIGN PATENT DOCUMENTS

| AU | 2003260071 | 3/2004 |
|---|---|---|
| EP | 0661677 | 7/1995 |

(Continued)

OTHER PUBLICATIONS

Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.mspx (printed Jul. 1, 2010, © 2010).

(Continued)

*Primary Examiner* — Kwang B Yao
*Assistant Examiner* — Adam Duda
(74) *Attorney, Agent, or Firm* — Patent Capital Group

(57) ABSTRACT

The method may include intercepting a data stream from the mobile device attempting to access the network resource, extracting information from the intercepted data stream relating to at least one of the mobile device or a user of the mobile device, accessing at least one of enterprise service based information and third party information regarding at least one of the mobile device or the user of the mobile device, determining whether the mobile device is authorized to access the network resource, preparing an access decision that specifies whether the mobile device is authorized to access the network resource, and storing the access decision in a database on the network.

19 Claims, 11 Drawing Sheets

(56) References Cited

U.S. PATENT DOCUMENTS

| | | | |
|---|---|---|---|
| 5,987,610 A | 11/1999 | Franczek et al. | |
| 6,000,000 A | 12/1999 | Hawkins et al. | |
| 6,006,274 A | 12/1999 | Hawkins et al. | |
| 6,073,142 A | 6/2000 | Geiger et al. | |
| 6,158,010 A | 12/2000 | Moriconi et al. | |
| 6,301,484 B1* | 10/2001 | Rogers et al. | 455/466 |
| 6,317,868 B1 | 11/2001 | Grimm et al. | |
| 6,460,050 B1 | 10/2002 | Pace et al. | |
| 6,661,780 B2 | 12/2003 | Li | |
| 6,678,827 B1 | 1/2004 | Rothermel | |
| 6,684,244 B1 | 1/2004 | Goldman et al. | |
| 6,694,434 B1 | 2/2004 | McGee et al. | |
| 6,766,165 B2 | 7/2004 | Sharma et al. | |
| 6,798,757 B2 | 9/2004 | Mizutani | |
| 6,804,722 B1 | 10/2004 | Nishi | |
| 6,839,766 B1 | 1/2005 | Parnafes et al. | |
| 6,944,183 B1 | 9/2005 | Iyer et al. | |
| 6,954,790 B2 | 10/2005 | Forslow | |
| 6,973,488 B1 | 12/2005 | Yavatkar et al. | |
| 7,003,562 B2 | 2/2006 | Mayer | |
| 7,089,592 B2 | 8/2006 | Adjaoute | |
| 7,103,772 B2 | 9/2006 | Jorgensen et al. | |
| 7,136,645 B2 | 11/2006 | Hanson et al. | |
| 7,136,907 B1 | 11/2006 | Nordstrom et al. | |
| 7,194,689 B2 | 3/2007 | Manni et al. | |
| 7,222,359 B2 | 5/2007 | Freund et al. | |
| 7,249,369 B2 | 7/2007 | Knouse et al. | |
| 7,308,703 B2 | 12/2007 | Wright et al. | |
| 7,317,699 B2 | 1/2008 | Godfrey et al. | |
| 7,346,340 B2 | 3/2008 | Purnadi et al. | |
| 7,386,888 B2 | 6/2008 | Liang et al. | |
| 7,428,583 B1 | 9/2008 | Lortz et al. | |
| 7,448,067 B2 | 11/2008 | Yadav | |
| 7,506,155 B1 | 3/2009 | Stewart et al. | |
| 7,546,629 B2 | 6/2009 | Albert et al. | |
| 7,562,388 B2 | 7/2009 | Hackenberger et al. | |
| 7,574,208 B2 | 8/2009 | Hanson et al. | |
| 7,665,118 B2 | 2/2010 | Mann et al. | |
| 7,669,237 B2 | 2/2010 | Shahbazi | |
| 7,734,284 B2 | 6/2010 | Adams et al. | |
| 7,774,363 B2 | 8/2010 | Lim | |
| 7,774,504 B2 | 8/2010 | Chene et al. | |
| 7,853,998 B2 | 12/2010 | Blaisdell et al. | |
| 7,865,938 B2 | 1/2011 | Shahbazi | |
| 7,971,232 B2 | 6/2011 | Hasbun | |
| 8,010,997 B2 | 8/2011 | Limont et al. | |
| 8,131,851 B2 | 3/2012 | Harlow | |
| 8,134,954 B2 | 3/2012 | Godfrey et al. | |
| 8,259,568 B2 | 9/2012 | Laudermilch et al. | |
| 8,259,611 B2 | 9/2012 | Godfrey et al. | |
| 8,341,693 B2 | 12/2012 | Shahbazi | |
| 8,495,700 B2 | 7/2013 | Shahbazi | |
| 8,565,726 B2 | 10/2013 | Walker et al. | |
| 8,572,676 B2 | 10/2013 | Sapp et al. | |
| 2001/0039624 A1 | 11/2001 | Kellum | |
| 2001/0041576 A1 | 11/2001 | I'Anson et al. | |
| 2002/0027569 A1 | 3/2002 | Manni et al. | |
| 2002/0032853 A1 | 3/2002 | Preston et al. | |
| 2002/0068559 A1 | 6/2002 | Sharma et al. | |
| 2002/0098830 A1 | 7/2002 | Lauper et al. | |
| 2002/0098840 A1 | 7/2002 | Hanson et al. | |
| 2002/0120599 A1 | 8/2002 | Knouse et al. | |
| 2002/0184532 A1 | 12/2002 | Hackenberger et al. | |
| 2002/0194317 A1 | 12/2002 | Kanada et al. | |
| 2003/0028651 A1 | 2/2003 | Schreckengast et al. | |
| 2003/0037129 A1 | 2/2003 | Beadles et al. | |
| 2003/0081621 A1 | 5/2003 | Godfrey et al. | |
| 2003/0108015 A1 | 6/2003 | Li | |
| 2003/0130953 A1 | 7/2003 | Narasimhan et al. | |
| 2003/0140246 A1 | 7/2003 | Kammer et al. | |
| 2003/0162555 A1 | 8/2003 | Loveland | |
| 2003/0167405 A1 | 9/2003 | Freund et al. | |
| 2003/0177389 A1 | 9/2003 | Albert et al. | |
| 2003/0182394 A1 | 9/2003 | Ryngler et al. | |
| 2003/0228866 A1 | 12/2003 | Pezeshki | |
| 2004/0009768 A1 | 1/2004 | Waters et al. | |
| 2004/0022258 A1 | 2/2004 | Tsukada et al. | |
| 2004/0030705 A1 | 2/2004 | Bowman-Amuah | |
| 2004/0030796 A1 | 2/2004 | Cooper et al. | |
| 2004/0043762 A1 | 3/2004 | Kim et al. | |
| 2004/0054739 A1 | 3/2004 | Friend et al. | |
| 2004/0064727 A1 | 4/2004 | Yadav | |
| 2004/0076128 A1 | 4/2004 | Rao et al. | |
| 2004/0083382 A1 | 4/2004 | Markham et al. | |
| 2004/0123150 A1 | 6/2004 | Wright et al. | |
| 2004/0128394 A1 | 7/2004 | Knauerhase et al. | |
| 2004/0179690 A1 | 9/2004 | Soliman | |
| 2004/0214570 A1 | 10/2004 | Zhang et al. | |
| 2004/0225524 A1 | 11/2004 | Narasimhan et al. | |
| 2004/0266395 A1 | 12/2004 | Pailles et al. | |
| 2004/0268145 A1 | 12/2004 | Watkins et al. | |
| 2005/0022012 A1 | 1/2005 | Bluestone et al. | |
| 2005/0055578 A1 | 3/2005 | Wright et al. | |
| 2005/0060393 A1 | 3/2005 | Parnafes et al. | |
| 2005/0097199 A1 | 5/2005 | Woodard et al. | |
| 2005/0101293 A1 | 5/2005 | Mentze et al. | |
| 2005/0135375 A1 | 6/2005 | Hurtta et al. | |
| 2005/0164691 A1 | 7/2005 | Payne | |
| 2005/0198306 A1 | 9/2005 | Palojarvi et al. | |
| 2005/0203881 A1 | 9/2005 | Sakamoto et al. | |
| 2005/0251853 A1 | 11/2005 | Bhargavan et al. | |
| 2005/0254652 A1 | 11/2005 | Engler et al. | |
| 2005/0255838 A1 | 11/2005 | Adams et al. | |
| 2005/0257246 A1 | 11/2005 | Adams et al. | |
| 2005/0262343 A1 | 11/2005 | Jorgensen et al. | |
| 2005/0268326 A1 | 12/2005 | Bhargavan et al. | |
| 2006/0005254 A1 | 1/2006 | Ross | |
| 2006/0031351 A1 | 2/2006 | Marston et al. | |
| 2006/0036730 A1 | 2/2006 | Graham et al. | |
| 2006/0075472 A1 | 4/2006 | Sanda et al. | |
| 2006/0089938 A1 | 4/2006 | Leonard et al. | |
| 2006/0095953 A1 | 5/2006 | Frank | |
| 2006/0112427 A1 | 5/2006 | Shahbazi | |
| 2006/0130139 A1 | 6/2006 | Sobel et al. | |
| 2006/0141995 A1 | 6/2006 | Purnadi et al. | |
| 2006/0161646 A1 | 7/2006 | Chene et al. | |
| 2006/0184490 A1 | 8/2006 | Heim et al. | |
| 2006/0190684 A1* | 8/2006 | McCammon et al. | 711/117 |
| 2006/0190984 A1 | 8/2006 | Heard et al. | |
| 2006/0224742 A1 | 10/2006 | Shahbazi | |
| 2006/0277590 A1 | 12/2006 | Limont et al. | |
| 2007/0006289 A1 | 1/2007 | Limont et al. | |
| 2007/0088948 A1 | 4/2007 | Ji et al. | |
| 2007/0143824 A1 | 6/2007 | Shahbazi | |
| 2007/0156670 A1 | 7/2007 | Lim | |
| 2007/0156694 A1 | 7/2007 | Lim | |
| 2007/0157287 A1 | 7/2007 | Lim | |
| 2007/0157288 A1 | 7/2007 | Lim | |
| 2007/0169168 A1 | 7/2007 | Lim | |
| 2007/0186275 A1 | 8/2007 | Shahbazi | |
| 2007/0266422 A1 | 11/2007 | Germano et al. | |
| 2008/0034401 A1 | 2/2008 | Wang | |
| 2008/0052383 A1 | 2/2008 | O'Shaughnessy et al. | |
| 2008/0065700 A1 | 3/2008 | Lim | |
| 2008/0066149 A1 | 3/2008 | Lim | |
| 2008/0070495 A1 | 3/2008 | Stricklen et al. | |
| 2008/0098062 A1 | 4/2008 | Balia | |
| 2008/0125102 A1 | 5/2008 | Abel et al. | |
| 2008/0137593 A1 | 6/2008 | Laudermilch et al. | |
| 2008/0184200 A1 | 7/2008 | Burns et al. | |
| 2008/0184201 A1 | 7/2008 | Burns et al. | |
| 2008/0184277 A1 | 7/2008 | Burns et al. | |
| 2008/0209505 A1 | 8/2008 | Ghai et al. | |
| 2009/0049166 A1 | 2/2009 | Roman et al. | |
| 2009/0049518 A1 | 2/2009 | Roman et al. | |
| 2009/0138939 A1 | 5/2009 | Kumar et al. | |
| 2009/0164560 A1 | 6/2009 | Fiatal | |
| 2009/0265754 A1 | 10/2009 | Hinds | |
| 2009/0298478 A1 | 12/2009 | Tyhurst et al. | |
| 2009/0322890 A1 | 12/2009 | Bocking et al. | |
| 2010/0037088 A1 | 2/2010 | Krivopaltsev et al. | |
| 2010/0064341 A1 | 3/2010 | Aldera | |
| 2010/0112983 A1 | 5/2010 | Walker et al. | |
| 2010/0115581 A1 | 5/2010 | Goldschlag et al. | |

(56) References Cited

U.S. PATENT DOCUMENTS

| | | | |
|---|---|---|---|
| 2010/0115582 | A1 | 5/2010 | Sapp et al. |
| 2010/0154025 | A1 | 6/2010 | Balducci et al. |
| 2010/0191847 | A1 | 7/2010 | Raleigh |
| 2011/0004913 | A1 | 1/2011 | Nagarajan et al. |
| 2011/0162049 | A1 | 6/2011 | Shahbazi |
| 2011/0167470 | A1 | 7/2011 | Walker et al. |
| 2011/0276683 | A1 | 11/2011 | Goldschlag et al. |
| 2011/0320819 | A1 | 12/2011 | Weber et al. |
| 2012/0270523 | A1 | 10/2012 | Laudermilch et al. |
| 2013/0047219 | A1 | 2/2013 | Shahbazi |

FOREIGN PATENT DOCUMENTS

| | | |
|---|---|---|
| EP | 1041506 | 10/2000 |
| EP | 1540446 | 6/2005 |
| EP | 1709556 | 7/2005 |
| EP | 1866789 | 12/2007 |
| EP | 2345205 | 7/2011 |
| GB | 1 496 984 | 12/1975 |
| WO | WO 02/19116 | 3/2002 |
| WO | WO 02/44892 | 6/2002 |
| WO | WO 03/027878 | 4/2003 |
| WO | WO 03/090492 | 10/2003 |
| WO | WO 2004/021114 | 3/2004 |
| WO | WO 2004/057834 | 7/2004 |
| WO | WO 2005/064498 | 7/2005 |
| WO | WO 2005/107144 | 11/2005 |
| WO | WO 2006/093917 | 9/2006 |
| WO | WO 2007/073278 | 6/2007 |
| WO | WO 2008/109866 | 9/2008 |
| WO | WO 2010/054258 | 5/2010 |

OTHER PUBLICATIONS

"Face-Image Capturing Method for Unattended Terminal", IBM Technical Disclosure Bulletin, IBM Corporation, New York, US, vol. 38, No. 1, Jan. 1995, pp. 101-102, XP000498703 ISSN: 0018-8689.
"Can You Manage an iPhone Like a BlackBerry?", Network World Middle East, Copyright IDG Middle East, Jul. 9, 2009 (3 pages).
"GuardianEdge Releases Smartphone Protection Product", ComputerTechnology Review, Nov. 28, 2007 (1 page).
Non-Final Office Action in U.S. Appl. No. 10/527,235 mailed on Jun. 28, 2006.
Response to Non-Final Office Action dated Jun. 28, 2006 in U.S. Appl. No. 10/527,235, filed Sep. 28, 2006.
Final Office Action in U.S. Appl. No. 10/527,235 mailed on Dec. 12, 2006.
Request for Continued Examination and Amendment in U.S. Appl. No. 10/527,235, filed Jun. 12, 2007.
Non-Final Office Action in U.S. Appl. No. 10/527,235 mailed on Aug. 28, 2007.
Response to Non-Final Office Action dated Aug. 28, 2007 in U.S. Appl. No. 10/527,235, filed Feb. 28, 2008.
Final Office Action in U.S. Appl. No. 10/527,235 mailed on Jul. 11, 2008.
Request for Continued Examination and Amendment in U.S. Appl. No. 10/527,235, filed Dec. 11, 2008.
Non-Final Office Action in U.S. Appl. No. 10/527,235 mailed on Jan. 9, 2009.
Response to Non-Final Office Action dated Jan. 9, 2009 in U.S. Appl. No. 10/527,235, filed Jul. 9, 2009.
Notice of Allowance in U.S. Appl. No. 10/527,235 mailed on Oct. 5, 2009.
Non-Final Office Action in U.S. Appl. No. 11/441,049 mailed on Oct. 17, 2006.
Response to Non-Final Office Action dated Oct. 17, 2006 in U.S. Appl. No. 11/441,049, filed Jan. 17, 2007.
Final Office Action in U.S. Appl. No. 11/441,049 mailed on Mar. 22, 2007.
Request for Continued Examination and Amendment in U.S. Appl. No. 11/441,049, filed Jun. 22, 2007.
Non-Final Office Action in U.S. Appl. No. 11/441,049 mailed on Sep. 24, 2007.
Response to Non-Final Office Action dated Sep. 24, 2007 in U.S. Appl. No. 11/441,049, filed Mar. 24, 2008.
Final Office Action in U.S. Appl. No. 11/441,049 mailed on Jul. 9, 2008.
Request for Continued Examination and Amendment in U.S. Appl. No. 11/441,049 filed on Jan. 9, 2009.
Non-Final Office Action in U.S. Appl. No. 11/441,049 mailed on Feb. 2, 2009.
Examiner Interview Summary in U.S. Appl. No. 11/441,049 mailed on Jul. 27, 2009.
Response to Non-Final Office Action dated Feb. 2, 2009 in U.S. Appl. No. 11/441,049, filed Aug. 27, 2009.
Non-Final Office Action in U.S. Appl. No. 11/441,049 mailed on Dec. 10, 2009.
Response to Non-Final Office Action dated Dec. 10, 2009 in U.S. Appl. No. 11/441,049, filed Jun. 10, 2010.
Examiner Interview Summary in U.S. Appl. No. 11/441,049 mailed on Jun. 14, 2010.
Notice of Allowance in U.S. Appl. No. 11/441,049 mailed on Aug. 23, 2010.
U.S. Appl. No. 12/972,410, filed Dec. 17, 2010, entitled "Enterprise-Wide Security System for Computer Devices," Inventor Majid Shahbazi.
Non-Final Office Action in U.S. Appl. No. 12/972,410 mailed on Sep. 21, 2011.
Response to Non-Final Office Action in U.S. Appl. No. 12/972,410, filed Dec. 21, 2011.
Final Office Action in U.S. Appl. No. 12/972,410 mailed on Mar. 7, 2012.
Request for Continued Examination and Amendment in U.S. Appl. No. 12/972,410, filed Jun. 7, 2012.
Notice of Allowance in U.S. Appl. No. 12/972,410 mailed on Jun. 25, 2012.
Non-Final Office Action in U.S. Appl. No. 11/578,420 mailed on Sep. 16, 2010.
Response to Non-Final Office Action dated Sep. 16, 2010 in U.S. Appl. No. 11/578,420, filed Dec. 16, 2010.
Final Office Action in U.S. Appl. No. 11/578,420 mailed on Mar. 4, 2011.
Request for Continued Examination and Amendment in U.S. Appl. No. 11/578,420 filed on Jun. 6, 2011.
Non-Final Office Action in U.S. Appl. No. 11/578,420 mailed on Jun. 22, 2011.
Response to Non-Final Office Action dated Jun. 22, 2011 in U.S. Appl. No. 11/578,420, filed Sep. 21, 2011.
Non-Final Office Action in U.S. Appl. No. 11/578,420 mailed on Dec. 1, 2011.
Response to Non-Final Office Action dated Dec. 1, 2011 in U.S. Appl. No. 11/578,420, filed Mar. 1, 2012.
Final Office Action in U.S. Appl. No. 11/578,420 mailed on May 14, 2012.
Non-Final Office Action in U.S. Appl. No. 11/363,283 mailed on Jun. 2, 2009.
Response to Non-Final Office Action dated Jun. 2, 2009 in U.S. Appl. No. 11/363,283, filed Oct. 2, 2009.
Final Office Action in U.S. Appl. No. 11/363,283 mailed on Jan. 5, 2010.
Request for Continued Examination and Amendment in U.S. Appl. No. 11/363,283, filed Jul. 6, 2010.
Non-Final Office Action in U.S. Appl. No. 11/363,283 mailed on Sep. 23, 2010.
Response to Non-Final Office Action dated Sep. 23, 2010 in U.S. Appl. No. 11/363,283, filed Dec. 20, 2010.
Final Office Action in U.S. Appl. No. 11/363,283 mailed on Mar. 9, 2011.
Requested for Continued Examination and Amendment in U.S. Appl. No. 11/363,283 filed on Jun. 9, 2011.
Non-Final Office Action in U.S. Appl. No. 11/363,283 mailed on Aug. 17, 2011.
Response to Non-Final Office Action dated Aug. 17, 2011 in U.S. Appl. No. 11/363,283, filed Nov. 17, 2011.

(56) References Cited

OTHER PUBLICATIONS

Final Office Action in U.S. Appl. No. 11/363,283 mailed on Jan. 30, 2012.
Request for Continued Examination and Amendment in U.S. Appl. No. 11/363,283, filed Apr. 29, 2012.
Non-Final Office Action in U.S. Appl. No. 11/877,656 mailed on Aug. 6, 2010.
Response to Non-Final Office Action dated Aug. 6, 2010 in U.S. Appl. No. 11/877,656, filed Nov. 8, 2010.
Final Office Action in U.S. Appl. No. 11/877,656 mailed on Mar. 1, 2011.
Request for Continued Examination and Amendment in U.S. Appl. No. 11/877,656, filed Jun. 1, 2011.
Notice of Allowance in U.S. Appl. No. 11/877,656 mailed on Jul. 12, 2011.
Request for Continued Examination and Amendment in U.S. Appl. No. 11/877,656 filed on Sep. 22, 2011.
Notice of Allowance in U.S. Appl. No. 11/877,656 mailed on Oct. 5, 2011.
Request for Continued Examination in U.S. Appl. No. 11/877,656 filed on Jan. 4, 2012.
Notice of Allowance in U.S. Appl. No. 11/877,656 mailed on Jan. 24, 2012.
Request for Continued Examination in U.S. Appl. No. 11/877,656 filed on Mar. 14, 2012.
Notice of Allowance in U.S. Appl. No. 11/877,656 mailed on Mar. 29, 2012.
Request for Continued Examination in U.S. Appl. No. 11/877,656 filed on Jun. 29, 2012.
U.S. Appl. No. 13/459,216, filed Apr. 29, 2012, entitled "System and Method for Controlling Mobile Device Access to a Network"; inventors Norm Laudermilch et al.
Non-Final Office Action in U.S. Appl. No. 12/614,319 mailed on Apr. 19, 2012.
Response to Non-Final Office Action dated Apr. 19, 2012 in U.S. Appl. No. 12/614,319, filed Jun. 22, 2012.
Non-Final Office Action in U.S. Appl. No. 12/614,326 mailed on Dec. 16, 2011.
Response to Non-Final Office Action in U.S. Appl. No. 12/614,326 filed on Mar. 16, 2012.
Final Office Action in U.S. Appl. No. 12/614,326 mailed on May 10, 2012.
Non-Final Office Action in U.S. Appl. No. 12/614,333 mailed on Mar. 28, 2012.
Response to Non-Final Office Action dated Mar. 28, 2012 in U.S. Appl. No. 12/614,333, filed May 29, 2012.
U.S. Appl. No. 12/830,861, filed Jul. 6, 2010, entitled "Mobile Data Security System and Methods".
Non-Final Office Action in U.S. Appl. No. 12/830,861 mailed on Jun. 21, 2012.
U.S. Appl. No. 13/102,627, filed May 6, 2011, entitled "Distributed Data Revocation Using Data Commands".
Request for Continued Examination and Amendment in U.S. Appl. No. 11/578,420 filed on Apr. 18, 2013.
Request for Continued Examination in U.S. Appl. No. 11/363,283 filed on Apr. 8, 2013.
Final Office Action in U.S. Appl. No. 13/459,216 mailed on Mar. 26, 2013.
Response to Non-Final Office Action dated Jul. 2, 2013 in U.S. Appl. No. 12/614,319, filed May 7, 2013.
Non-Final Office Action in U.S. Appl. No. 13/102,627 mailed on Mar. 28, 2013.
Nayak, et al., "Security Issues in Mobile Data Networks," Vehicular Technology Conference, 2004; VTC2004—Fall 2004; IEEE 60th., vol. 5, pp. 3229-3233.
International Preliminary Examination Report for International Application No. PCT/US03/26645 completed Mar. 3, 2005 (6 pages).
PCT Written Opinion in International Application U.S. Appl. No. PCT/US03/26645 mailed on Jan. 21, 2005 (7 pages).
International Search Report for International Application No. PCT/US03/26645 mailed Feb. 13, 2004 (3 pages).
International Preliminary Examination Report for International Application No. PCT/US04/042565 mailed Jul. 17, 2006 (7 pages).
Written Opinion of the International Searching Authority for International Application No. PCT/US04/42565 mailed May 25, 2005 (6 pages).
International Search Report for International Application No. PCT/US04/42565 mailed May 25, 2005 (1 page).
Supplementary European Search Report for EPO Application No. EP 04 81 4713 completed Apr. 25, 2007.
EPO Replacement International Search Report for EP Application No. 04814713.6-1238/1709556 mailed on May 30, 2011.
European Patent Office Communication Pursuant to Article 94(3) EPC (Examination Report) dated Sep. 29, 2011 in EP Application No. 04814713.6.
International Preliminary Report on Patentability issued Mar. 24, 2009 (1 page) and Written Opinion of the International Searching Authority mailed Feb. 29, 2008 (4 pages) for International Application No. PCT/US06/06968.
International Search Report for International Application No. PCT/US06/06968 mailed Feb. 29, 2008 (1 page).
International Search Report and Written Opinion for International Application No. PCT/US2009/063640 mailed Apr. 20, 2010 (13 pages).
International Preliminary Report on Patentability and Written Opinion for International Application. No. PCT/US2009/063640 mailed May 9, 2011 (10 pages).
European Patent Office Communication Pursuant to Rules 161(1) and 162 EPC in EP Application No. 09759830.4-1244 mailed on Jun. 15, 2011.
Request for Continued Examination and Amendment in U.S. Appl. No. 11/441,049 filed on Aug. 14, 2012.
Request for Continued Examination in U.S. Appl. No. 12/972,410 filed on Sep. 23, 2012.
Notice of Allowance in U.S. Appl. No. 12/972,410 mailed on Oct. 17, 2012.
U.S. Appl. No. 13/630,830, filed Sep. 28, 2012 entitled "Enterprise-Wide Security System for Computer Devices", Inventor, Majid Shahbazi.
Request for Continued Examination and Amendment in U.S. Appl. No. 11/578,420 filed on Aug. 14, 2012.
Notice of Allowance in U.S. Appl. No. 11/578,420 mailed on Sep. 26, 2012.
Request for Continued Examination in U.S. Appl. No. 11/578,420 filed on Dec. 21, 2012.
Notice of Allowance in U.S. Appl. No. 11/578,420 mailed on Jan. 18, 2013.
Request for Continued Examination and Amendment in U.S. Appl. No. 11/363,283 filed on Apr. 29, 2012.
Notice of Allowance in U.S. Appl. No. 11/363,283 mailed on Jan. 7, 2013.
Notice of Allowance in U.S. Appl. No. 11/877,656 mailed on Jul. 20, 2012.
Non-Final Office Action in U.S. Appl. No. 13/459,216 mailed on Dec. 7, 2012.
Response to Non-Final Office Action dated Dec. 7, 2012 in U.S. Appl. No. 13/459,216, filed Mar. 7, 2013.
Final Office Action in U.S. Appl. No. 12/614,319 mailed on Sep. 20, 2012.
Request for Continued Examination and Amendment in U.S. Appl. No. 12/614,319 filed on Nov. 28, 2012.
Non-Final Office Action in U.S. Appl. No. 12/614,319 mailed on Feb. 7, 2013.
Request for Continued Examination and Amendment in U.S. Appl. No. 12/614,326 filed on Aug. 10, 2012.
Non-Final Office Action in U.S. Appl. No. 12/614,326 mailed on Dec. 12, 2012.
Response to Non-Final Office Action dated Dec. 12, 2012 in U.S. Appl. No. 12/614,326, filed Mar. 8, 2013.
Notice of Allowance in U.S. Appl. No. 12/614,326 mailed on Mar. 19, 2013.

(56) References Cited

OTHER PUBLICATIONS

Final Office Action in U.S. Appl. No. 12/614,333 mailed on Aug. 1, 2012.
Request for Continued Examination and Amendment in U.S. Appl. No. 12/614,333 filed on Nov. 1, 2012.
Notice of Allowance in U.S. Appl. No. 12/614,333 mailed on Mar. 5, 2013.
European Patent Office Communication Pursuant to Article 94(3) EPC (Examination Report) dated Jul. 5, 2013 in EP Application No. 09759830.4.
Non-Final Office Action in U.S. Appl. No. 13/630,830 mailed on Aug. 26, 2013.
Advisory Action in U.S. Appl. No. 13/459,216 mailed on Jul. 19, 2013.
Final Office Action in U.S. Appl. No. 12/614,319 mailed on Aug. 7, 2013.
AF Response to Final Office Action dated Mar. 26, 2013 in U.S. Appl. No. 13/459,216, filed Jun. 26, 2013.
Response to Non-Final Office Action dated Feb. 7, 2013 in U.S. Appl. No. 12/614,319, filed May 7, 2013.
Request for Continued Examination in U.S. Appl. No. 12/614,326, filed Jun. 19, 2013.
Notice of Allowance in U.S. Appl. No. 12/614,326 mailed on Jul. 15, 2013.
Notice of Allowance in U.S. Appl. No. 12/614,333 mailed on Jul. 1, 2013.
Notice of Allowance in U.S. Appl. No. 11/363,283 mailed on May 24, 2013.
Request for Continued Examination in U.S. Appl. No. 12/614,333 filed on Jun. 5, 2013.
Response to Non-Final Office Action dated Mar. 28, 2013 in U.S. Appl. No. 13/102,627, filed Jun. 17, 2013.
Notice of Allowance in U.S. Appl. No. 11/578,420 mailed on Sep. 17, 2013.
Corrected Notice of Allowance in U.S. Appl. No. 11/578,420 mailed on Oct. 23, 2013.
Final Office Action in U.S. Appl. No. 13/102,627 mailed on Sep. 26, 2013.

* cited by examiner

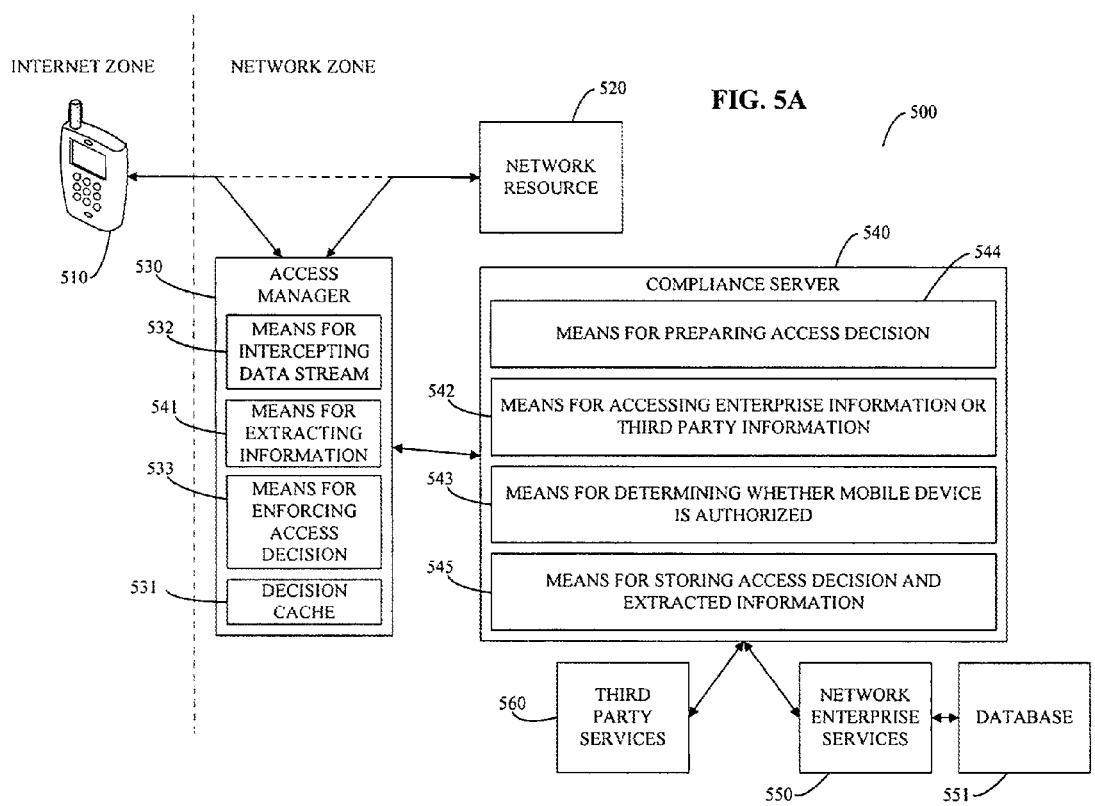

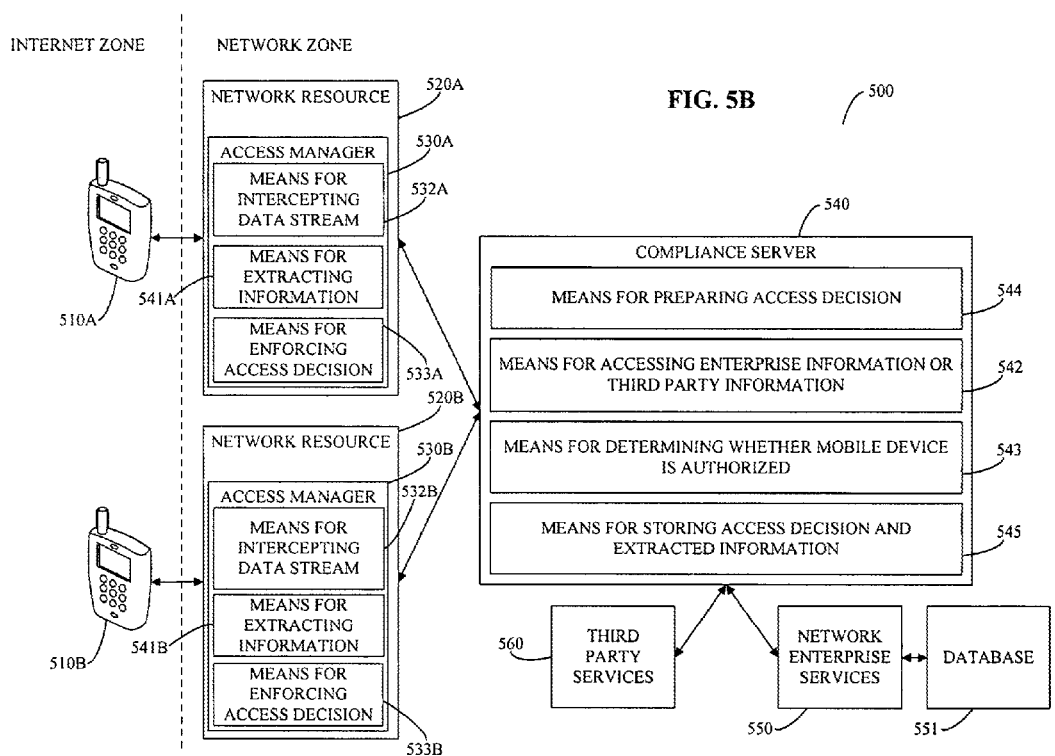

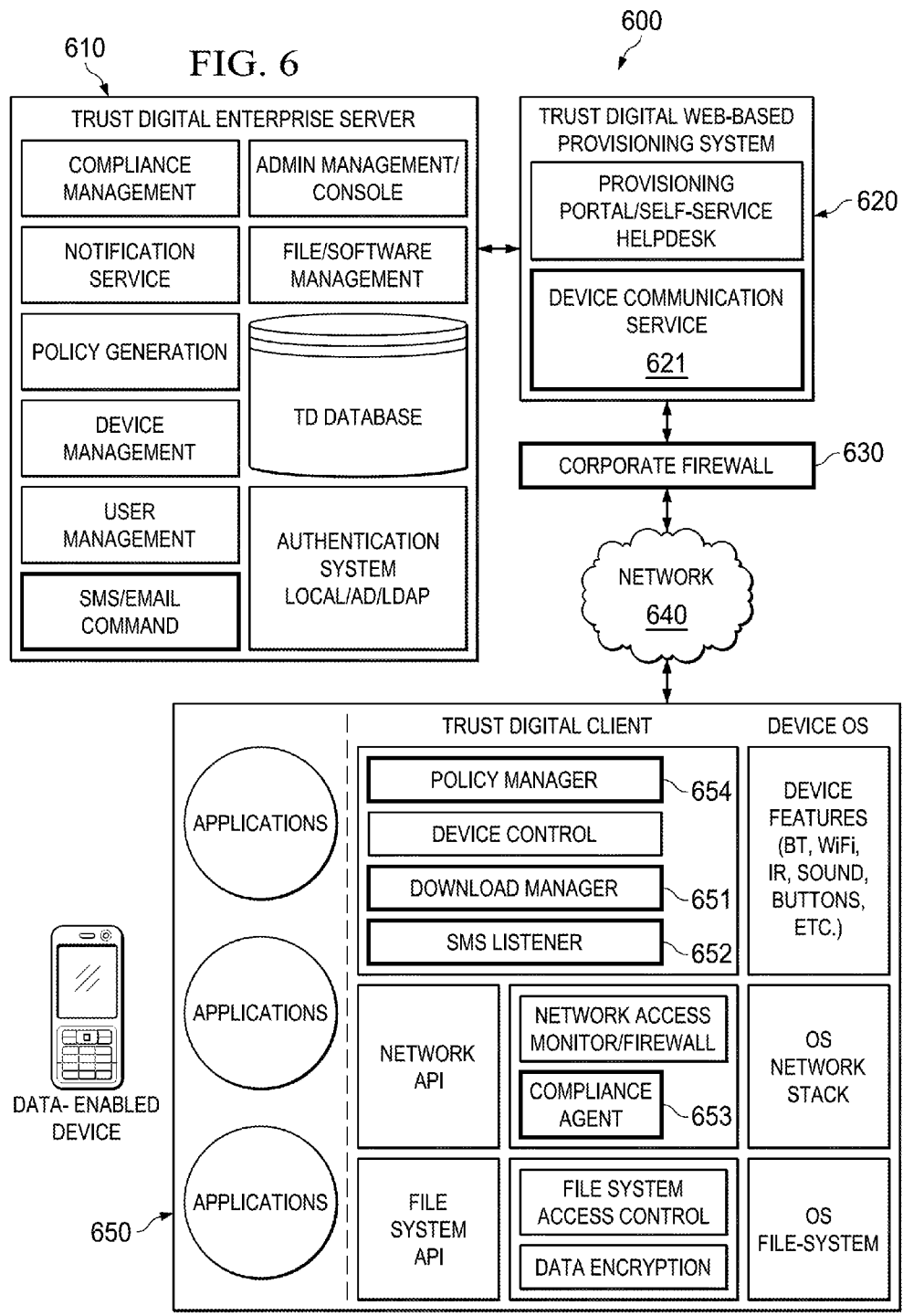

SYSTEM AND METHOD FOR CONTROLLING MOBILE DEVICE ACCESS TO A NETWORK

RELATED CASE INFORMATION

This application is a continuation (and claims the benefit of priority under 35 U.S.C. §120) of U.S. patent application Ser. No. 11/877,656, filed on Oct. 23, 2007, and entitled "SYSTEM AND METHOD FOR CONTROLLING MOBILE DEVICE ACCESS TO A NETWORK", which claims priority to U.S. Provisional Patent Application Serial No. 60/853,460, filed on Oct. 23, 2006, and entitled "MOBILE DEVICE SECURITY SYSTEM". The disclosure of the prior applications are considered part of (and are incorporated by reference in their entirety) the disclosure of this application.

FIELD OF THE INVENTION

The invention relates generally to systems and methods for controlling mobile device access to a network. More specifically, the invention relates to systems and methods for preventing unauthorized access to a network resource on a network by a mobile device.

BACKGROUND OF INVENTION

Never has data, such as corporate data, been so mobile—and so prone to theft, loss or corruption. With more than 2 billion handheld devices (PDAs, Smart Phones, Blackberry's™, thumbdrives, iPods™, other handheld devices, etc) already in use, they are becoming more and more commonplace in the corporate environment. Many of these devices are purchased for personal use, but are finding their way into corporate environments and are being used to access corporate information. This changing IT landscape, sometimes referred to as "shadow" IT, is particularly acute at the "mobile edge" or the "perimeter"—the dynamically changing end points of an enterprise network where the type, platform and use of these devices is continuously changing and evolving.

These mobile devices have quickly become the productivity tools of choice for most knowledge workers. The devices are relied upon because of their immediate access to information, their small form factor and faster collection of information. However, such benefits come with tremendous financial, regulatory and brand risk. These devices, if unsecured, can be a primary source of infections via rogue access, data theft, and unsecured transfer of information and inadvertent release of confidential information. Increasingly they are also causing significant IT challenges and helpdesk headaches.

Effective management of these new risks is as critical as it is complex. The complexities lie in many area's of concern. Some analysts estimate that as many as 30% of these devices are lost per year (SANS Institute). The small form factor of these devices also creates new internal security threats due to their ability to be easily concealed. Gartner estimates that more than 70% of unauthorized access to information systems is committed by employees, as are more than 95% of intrusions that result in significant financial losses. Further, Gartner predicts that through 2006, 90 percent of mobile devices containing enterprise data will have insufficient power-on protection and storage encryption to withstand casual to moderate hacker attacks. This risk has led them to recommend that enterprises immediately start addressing their mobile storage risks.

Corporate enterprises are faced with the challenge of managing the balance between end user productivity, an appropriate level of data security while minimizing IT intervention. Organizations are asking if the solution is an extension of current vendors' solutions, or do they require a fresh approach that leverages security best practices empowered by software that can take advantage of knowing and understanding the dynamics at the mobile edge. The liabilities and risks associated with an unsecured mobile edge are growing. While enterprises look to leverage the competitive advantages and productivity gains associated with the introduction of smart phones and other mobile devices, the security risks continue to increase.

Legislation mandating the protection, management, or verification of financial data and personal information is forcing corporate action and accountability. Legislation stipulating the protection of personal data is commonplace, with penalties for failing to comply becoming increasingly severe. HIPAA, PIPEDA, GLBA, The Data Protection Act, SB1386, SOXA, are examples of regulations targeting organizations that deal in maintenance and transfer of sensitive corporate and consumer information.

Further, complicating this challenge is the general openness of the Microsoft Desktop environment. Now more than ever, every port, external disk drive, or memory stick can become a huge regulatory or financial risk. To confront these growing challenges some IT departments have turned to soldering and gluing USB ports to prevent intrusion, or putting titanium "chastity belts" around computers. Others are looking for more elegant ways to manage the risks associated with the inherent access to enterprise data. USB ports, for instance, can be used for a variety functions from input devices such as mice and keyboards to mobile data storage devices (capable of downloading gigabytes of data or uploading unapproved or malicious software). Devices as inconspicuous as iPods and other entertainment devices are now capable of not only downloading more than 30 GBs of data, they can also, unknown to the user and corporate IT, put aware and other potentially malicious software directly onto the users hard disk.

Mobile devices are key competitive tools in today's marketplace and business, as well as government agencies. These organizations should preferably find ways to transparently apply the necessary security policies to them—to minimize knowledge worker productivity. One of the biggest challenges, the protection of sensitive data including client financial information and patient information, has many issues associated with it and requires a comprehensive solution to achieve the intended result.

Prior art security systems for networks commonly employs static, legacy-type and fixed policy-based approaches controlled from within an enterprise system for protecting data and network access to it. However, mobile communications devices having data storage and software applications create new challenges for network security, in particular because the portable mobile communications devices have a range of software, applications, functions and changes to their operating characteristics occur from time to time without authorization from the security system. A mobile device that is compliant with a security policy can be readily changed to present a security risk subsequent to policy compliance checking. For example, various peripherals can be connected to mobile devices, the devices can communicate with various public networks, and application software can be easily added to the devices.

Since mobile communications devices are intended to enhance productivity for mobile knowledge workers, access to the enterprise network and data stored on servers therein is important to ensuring their productivity. Thus, there remains a need for systems and methods that effectively verify that mobile devices attempting to access a network resource is both authorized to access that network resource and in compliance with network security policies.

SUMMARY OF THE INVENTION

Accordingly, the invention provides a method for managing access to a network resource on a network from a mobile device, the method including the steps of intercepting a data stream from the mobile device attempting to access the network resource, extracting information from the intercepted data stream relating to at least one of the mobile device or a user of the mobile device, accessing at least one of enterprise service based information and third party information regarding at least one of the mobile device or the user of the mobile device, determining whether the mobile device is authorized to access the network resource based on the extracted information and the enterprise service based information or the third party information, preparing an access decision based on the extracted information and the at least one of enterprise service based information and third party information, wherein the access decision specifies whether the mobile device is authorized to access the network resource, and storing the access decision in a database on the network.

The method may also include the step of enforcing the access decision by granting access to the mobile device to the network resource if the mobile device is determined to be authorized and denying access to the mobile device to the network resource if the mobile device is determined not to be authorized. Moreover, the method may include storing the extracted information in the database.

The invention also relates to a system for managing access to a network resource on a network from a mobile device. The system comprises a means for intercepting a data stream from the mobile device attempting to access the network resource, a means for extracting information from the intercepted data stream relating to at least one of the mobile device or a user of the mobile device, a means for accessing at least one of enterprise service based information and third party information regarding at least one of the mobile device or the user of the mobile device, a means for determining whether the mobile device is authorized to access the network resource based on the extracted information and the enterprise service based information or the third party information, a means for preparing an access decision based on the extracted information and the at least one of enterprise service based information and third party information, wherein the access decision specifies whether the mobile device is authorized to access the network resource, and a means for storing the access decision in a database on the network.

The system may also include a means for enforcing the access decision by granting access to the mobile device to the network resource if the mobile device is determined to be authorized and denying access to the mobile device to the network resource if the mobile device is determined not to be authorized, and a means for storing the extracted information in the database.

The access decision may include information regarding at least one of a health profile of the mobile device, the authenticity of the mobile device or a user of the mobile device, or the authorization of the mobile device or the user of the mobile device to access the network resource. In addition, the data stream may be an application level data stream. Also, the enterprise service based information may include at least one of information stored within a database and information stored within an active director, and the third party information may include a certificate authority. Moreover, the access decision may be stored in a decision cache.

The invention further relates to a method for managing access to a network resource on a network from a mobile device, the method including the steps of intercepting a data stream from the mobile device attempting to access the network resource, extracting information from the intercepted data stream relating to at least one of the mobile device or a user of the mobile device, submitting a query to a compliance server to determine whether the mobile device is authorized to access the network resource, and receiving a response from the compliance server.

If the received response indicates that the query was not received by the compliance server, the method includes the steps of accessing a decision cache to determine if the decision cache includes cached information regarding whether the mobile device has been granted access or denied access during a previous attempt to access the network resource, and granting or denying the mobile device access to the network resource based on the cached information in the decision cache.

If the received response indicates that the query was received by the compliance server and that the mobile device is authorized to access the network resource, the method includes the step of granting the mobile device access to the network resource.

If the received response indicates that the query was received by the compliance server and that the mobile device is not authorized to access the network resource, the method includes the step of denying the mobile device access to the network resource.

The invention also relates to a method for managing access to a network resource on a network from a mobile device, the method including the steps of intercepting a data stream from the mobile device attempting to access the network resource, extracting information from the intercepted data stream relating to at least one of the mobile device or a user of the mobile device, submitting a query to a compliance server to determine whether the mobile device is authorized to access the network resource, receiving a response from the compliance server, and, if the received response indicates that the query was not received by the compliance server, granting the mobile device access to the network resource.

The invention further relates to a method for managing access to a network resource on a network from a mobile device, the method including the steps of intercepting a data stream from the mobile device attempting to access the network resource, extracting information from the intercepted data stream relating to at least one of the mobile device or a user of the mobile device, submitting a query to a compliance server to determine whether the mobile device is authorized to access the network resource, receiving a response from the compliance server, and, if the received response indicates that the query was not received by the compliance server, denying the mobile device access to the network resource.

Moreover, the invention relates to a method for managing access to a network resource on a network from a mobile device, the method including the steps of intercepting a data stream from the mobile device attempting to access the network resource, extracting information from the intercepted data stream relating to at least one of the mobile device or a user of the mobile device, and accessing a decision cache to determine whether the mobile device has been granted access or denied access during a previous attempt to access the network resource.

If the decision cache includes cached information regarding whether the mobile device has been granted access or denied access during a previous attempt to access the network resource, the method includes the step of granting or denying the mobile device access to the network resource based on the cached information in the decision cache.

If the decision cache does not include cached information regarding whether the mobile device has been granted access or denied access during a previous attempt to access the network resource, the method includes the step of submitting a query to a compliance server to determine whether the mobile device is authorized to access the network resource.

BRIEF DESCRIPTIONS OF THE DRAWINGS

FIGS. 5A-5B illustrate exemplary systems of the invention having means for carrying out methods of the invention in which the access manager is located in the network zone.

FIG. 6 illustrates an exemplary system of the invention according to a preferred embodiment.

DETAILED DESCRIPTION OF THE INVENTION

As described briefly above, and as is shown in the figures, the invention relates to systems and methods for managing access to a network resource on a network from a mobile device. More particularly, the invention relates to compliance checking when a mobile device is accessing any Network Service, for example, synchronizing Email, using a mechanism that intercepts the application level stream, interpreting that stream to extract identifying information, forming a query to a Compliance Service (i.e. a compliance server), which computes the results based on configuration information stored in a device management database, reports the result of the access, and optionally decides to whether to permit or deny the access. Exemplary preferred embodiments of the invention are described below with reference to the figures.

Figure 1:
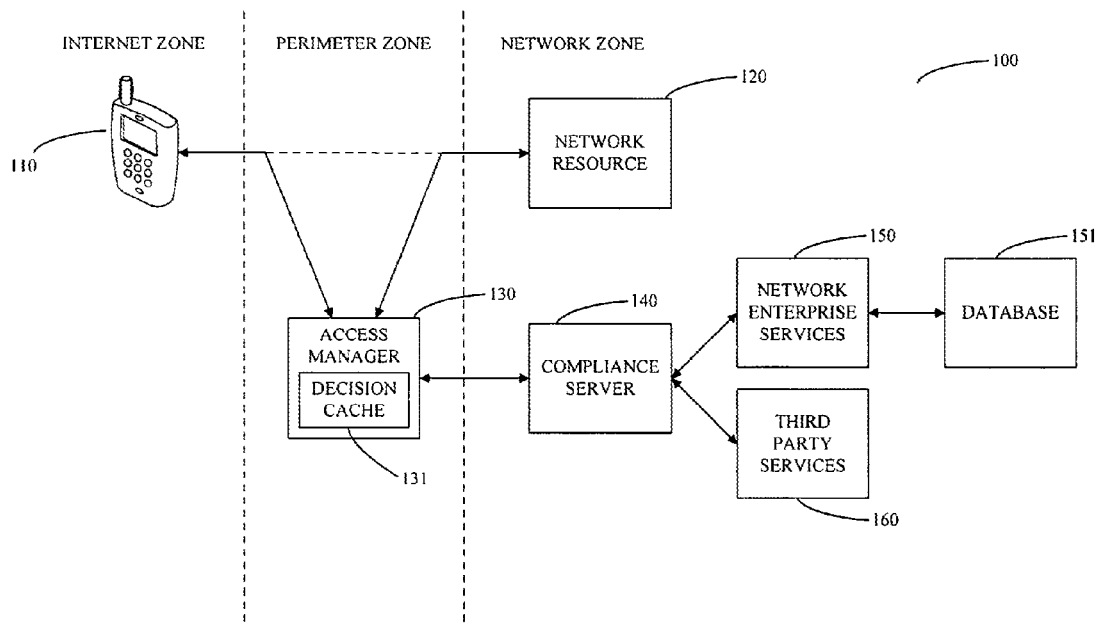
FIG. 1 illustrates an exemplary system of the invention in which the access manager intercepts a data stream from a mobile device to a network resource.

Referring now to system 100 shown in FIG. 1, a client device 110 from the internet zone attempts to access a network resource 120 in the network zone using a data stream, which is preferably an application level data stream. However, the stream can be at any layer in the OSI stack. For example, the data stream may include applications such as email, IM, Enterprise LOB (line-of-business) applications (i.e. sales automation, field force, expense reporting), SQL, voice services (pbx, voicemail), and the like. The data stream is intercepted in the perimeter zone by an access manager 130, which may or may not include a decision cache 131.

Access manager 130 then extracts information from the intercepted data stream relating to at least one of mobile device 110 or a user of mobile device 110. The extracted information may include any type of information about the mobile device, for example, source and destination addresses (e.g., MAC, IP), service type (e.g., Port info), authentication information from an SSL negotiation that includes a client side certification (e.g., a user or device certificate, hard or soft), as well as identifying information embedded in the protocol headers (e.g., authentication information in HTTP headers) or identifying information in the application layer (e.g., username/password, device ID, phone number). The information may also be correlated with other identifying information in database 151. For example, the Device ID from the application layer may be correlated with a device certificate already stored in the database. Access manager 130 submits the extracted information to a compliance server 140, which is preferably located within the network zone.

Compliance server 140 then accesses at least one of enterprise service based information from network enterprise services 150 and third party information from third party services 160 regarding at least one of mobile device 110 or the user of mobile device 110. Compliance server 140 then determines whether mobile device 110 is authorized to access network resource 120 based on the extracted information and the enterprise service based information or the third party information.

After determining whether mobile device 110 is authorized to access network resource 120, compliance server 140 prepares an access decision based on the extracted information and the at least one of enterprise service based information and third party information. The enterprise service based information preferably includes at least one of information stored within a database, such as database 151, and information stored within an directory service. The third party information may include information such as information found within a certificate authority, for example.

The access decision specifies whether mobile device 110 is authorized to access network resource 120. In addition, the access decision preferably includes information regarding at least one of a health profile of the mobile device, the authenticity of the mobile device or a user of the mobile device, or the authorization of the mobile device or the user of the mobile device to access the network resource. A health profile for a mobile device includes factors such as the Mobile OS, the device model, OS updates, applications on the device, anti-virus applications, configurations, policies, and the like.

Generally, the Access Decision may result from a process as simple as checking whether the IP address from the session is in the database, or the compliance server may verify that the device identified in the session has checked into the database recently, or check whether the device health information in the database is up-to-date. The compliance server may also query other directory services while creating the access decision. For example, the username/password of a user of the mobile device may be verified against an directory service in the enterprise services or a certificate, either from the SSL negotiation, from a third party service, or the correlated certificate in the database may be checked for validity.

Compliance server 140 then stores stored the access decision in a database on the network, such as database 151. Compliance server 140 is also capable of storing the extracted information in the database.

The access decisions may also be enforced by access manager 130 by granting access to mobile device 110 to network resource 120 if mobile device 110 is determined to be authorized by compliance server 140 or denying access to mobile device 110 to network resource 120 if mobile device 110 is determined not to be authorized by compliance server 140.

However, access decisions can be enforced at the perimeter through a dedicated device, an existing Firewall or router or switch, or at the application server inside the network.

Moreover, the access decision may be stored in a decision cache, for example, in decision cache 131, which may be accessed as a later time by the access manager an as alternative means for determining whether the mobile device is authorized to access the network resource.

Figure 2A:
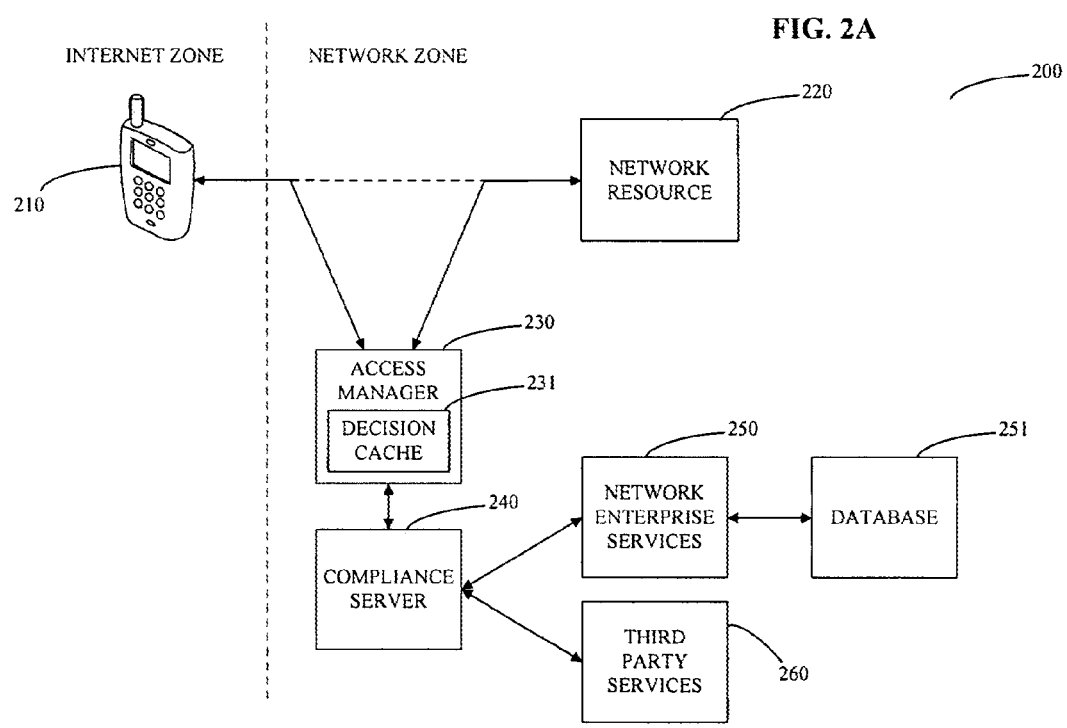
FIGS. 2A-2B illustrate exemplary systems of the invention in which the access manager is located in the network zone.
Figure 2B:
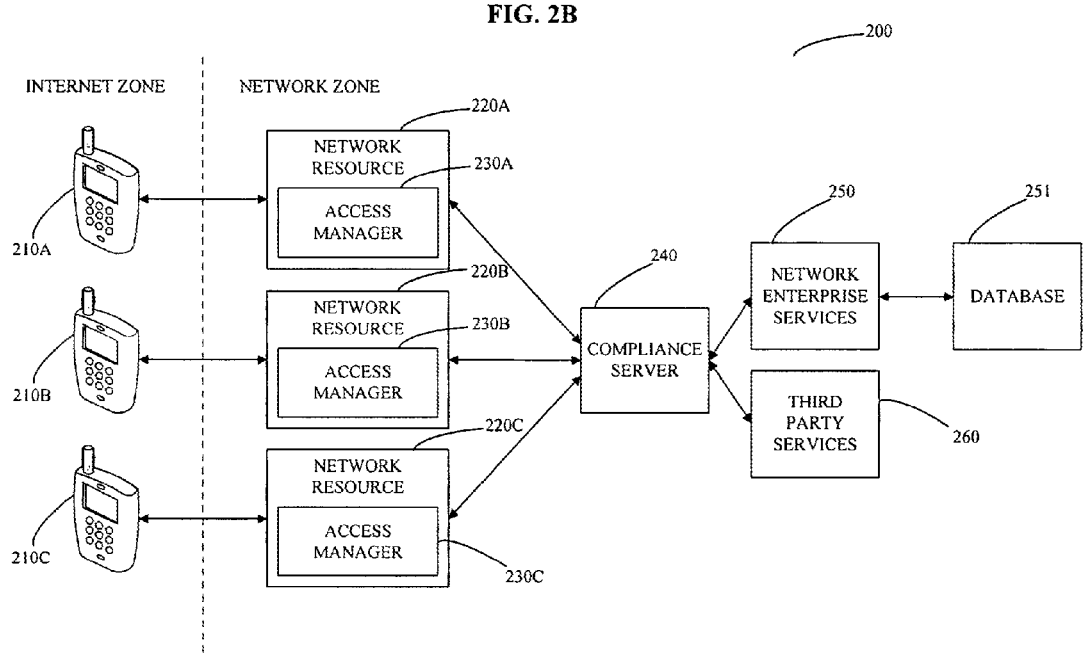

FIGS. 2A-2B illustrate a similar system 200, which has one significant difference. In system 200, the access manager 230 is located within the network zone, not within the perimeter zone as in system 100 in FIG. 1. Thus, when client device 210 from the internet zone attempts to access a network resource 220 in the network zone, the data stream is allowed to enter the network zone before it is intercepted by access manager 230, which may or may not include a decision cache 231. After intercepting the data stream, access manager 230 submits the intercepted data stream to a compliance server 240, which is also located within the network zone.

In an alternative embodiment, the network resource may include the access manager. For example, as is shown in FIG. 2B, network resources 220A-C may include access managers 230A-C, respectively. In this configuration, when mobile devices 210A-C attempt to access network resource 220A-C, access managers 230A-C intercept the data stream from within network resource 220A-C, extract information from the intercepted data stream relating to at least one of mobile device 210 or a user of mobile device 210, and forward the extracted information to compliance server 240.

Compliance server 240 then accesses at least one of enterprise service based information from network enterprise services 250 and third party information from third party services 260 regarding at least one of mobile device 210 or the user of mobile device 210. Compliance server 240 then determines whether mobile device 210 is authorized to access network resource 220 based on the extracted information and the enterprise service based information or the third party information.

After determining whether mobile device 210 is authorized to access network resource 220, compliance server 240 prepares an access decision based on the extracted information and the at least one of enterprise service based information and third party information. Compliance server 240 then stores stored the access decision in a database on the network, such as database 251. Compliance server 240 is also capable of storing the extracted information in the database, and may also store the access decision in a decision cache.

Figure 3:
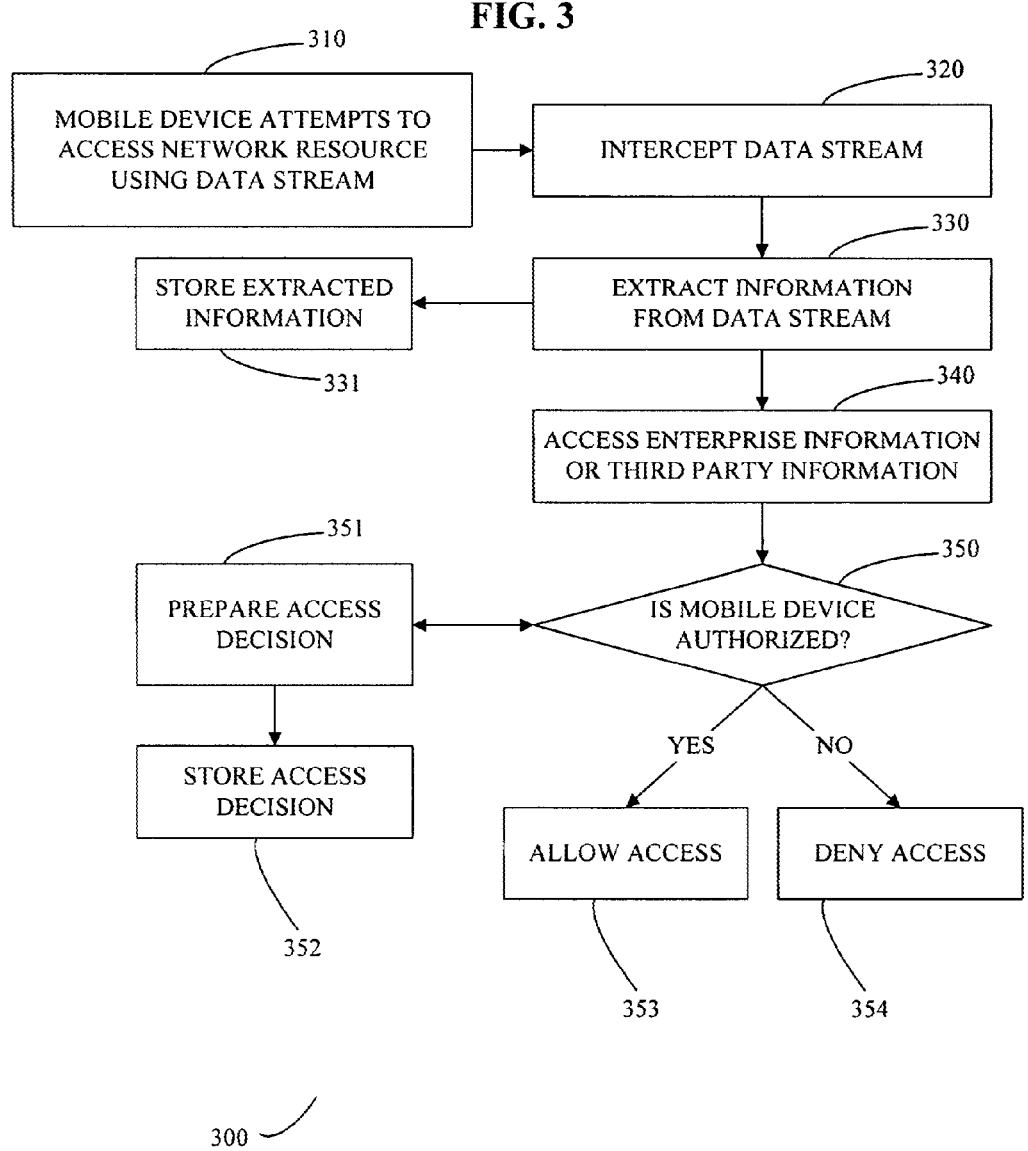
FIG. 3 is a flow chart illustrating an exemplary method of the invention.

Thus, as is described above, the invention relates to a method 300 for managing access to a network resource on a network from a mobile device illustrated in FIG. 3. In step 310, a mobile device attempts to access a network resource using a data stream. In step 320, the data stream is intercepted, for example, by an access manager. In step 330, information is extracted from the data stream, for example, by a access manager. The extracted information may be stored in a database for example, in step 331. Then, in step 340, the compliance server accesses at least one of enterprise information or third party information regarding at least one of the mobile device or the user of the mobile device. In step 350, the compliance server determines whether the mobile device is authorized to access the network resource based on the extracted information and the enterprise service based information or the third party information. After the determination is made, the compliance server prepares, in step 351, an access decision based on the extracted information and the at least one of enterprise service based information and third party information, wherein the access decision specifies whether the mobile device is authorized to access the network resource. The access decision may be stored in a database on the network in step 352.

In addition, the access decision may be enforced, for example, by the access manager, and the mobile device may be granted access in step 353 or denied access in step 354.

Figure 4:
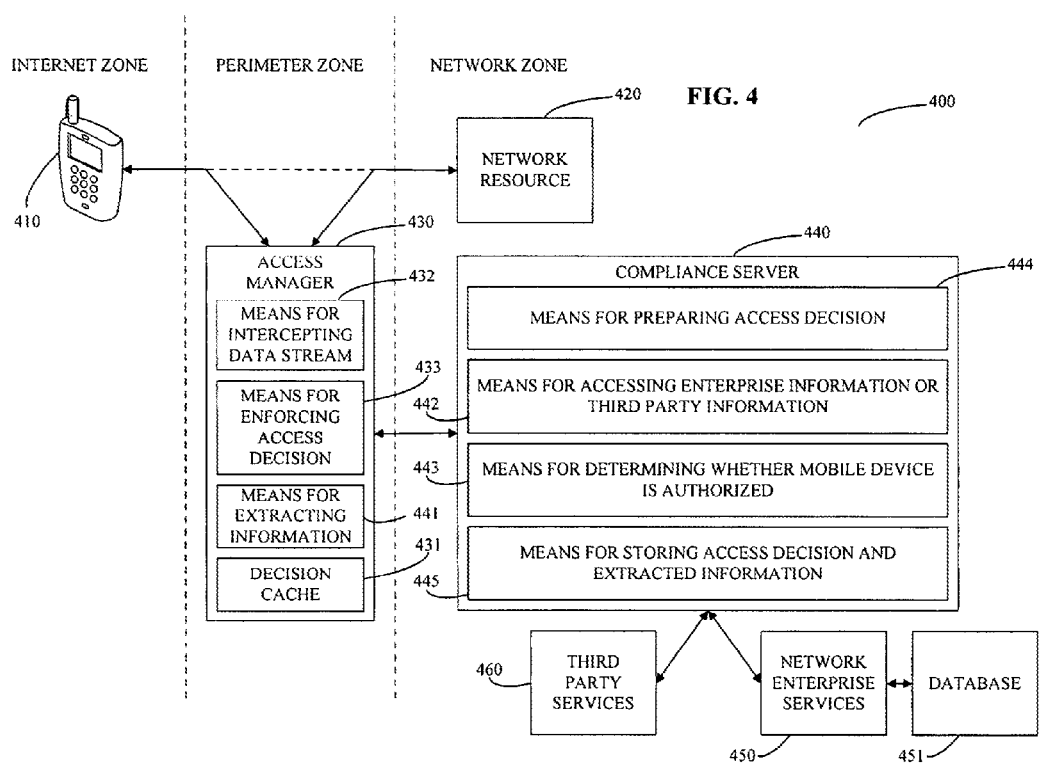
FIG. 4 illustrates an exemplary system of the invention having means for carrying out a method of the invention.

As is shown in FIG. 4, the invention also relates to a system 400 for managing access to a network resource 420 on a network from a mobile device 410, the system including the same general components as is described above with reference to FIG. 1.

However, in this system, access manager 430 includes an optional decision cache 431, a means 432 for intercepting a data stream from the mobile device attempting to access the network resource, a means 441 for extracting information from the intercepted data stream relating to at least one of the mobile device or a user of the mobile device, and a means 433 for enforcing the access decision by granting access to the mobile device to the network resource if the mobile device is determined to be authorized and denying access to the mobile device to the network resource if the mobile device is determined not to be authorized.

In addition, compliance server 440 preferably includes a means 442 for accessing at least one of enterprise service based information from network enterprise services 450 and third party information from third party services 460 regarding at least one of the mobile device or the user of the mobile device, a means 443 for determining whether the mobile device is authorized to access the network resource based on the extracted information and the stored information, a means 444 for preparing an access decision based on the extracted information and the at least one of enterprise service based information and third party information, and a means 445 for storing the access decision and the extracted information in a database 451 on the network.

FIGS. 5A-5B illustrate a similar system 500, which, like system 200 shown in FIGS. 2A-2B, has one significant difference from system 400. In system 500, the access manager 530 is located within the network zone, not within the perimeter zone. Thus, when client device 510 attempts to access a network resource 520 in the network zone, the data stream is allowed to enter the network zone before it is intercepted by access manager 530. After intercepting the data stream, access manager 530 submits the intercepted data stream to a compliance server 540, which is also located within the network zone.

However, in this system, access manager 530 includes an optional decision cache 531, a means 532 for intercepting a data stream from the mobile device attempting to access the network resource, a means 541 for extracting information from the intercepted data stream relating to at least one of the mobile device or a user of the mobile device, and a means 533 for enforcing the access decision by granting access to the mobile device to the network resource if the mobile device is determined to be authorized and denying access to the mobile device to the network resource if the mobile device is determined not to be authorized.

In addition, compliance server 540 preferably includes a means 544 for accessing at least one of enterprise service based information from network enterprise services 550 and third party information from third party services 560 regarding at least one of the mobile device or the user of the mobile device, a means 543 for determining whether the mobile device is authorized to access the network resource based on the extracted information and the stored information, a means 544 for preparing an access decision based on the extracted information and the at least one of enterprise service based information and third party information, and a means 545 for storing the access decision and the extracted information in a database 551 on the network.

FIG. 5B shows an alternative embodiment similar to that shown in FIG. 2B in which the network resource may include the access manager. For example, network resources 520A-B may include access managers 530A-B, respectively. In this configuration, when mobile devices 510A-B attempt to access network resource 520A-B, access managers 530A-B intercept the data stream from within network resource 520A-B, extract information from the intercepted data streams relating to at least one of the mobile devices or a user of mobile devices, and forward the intercepted data streams to compliance server 540.

Compliance server 540 then accesses at least one of enterprise service based information from network enterprise services 550 and third party information from third party services 560 regarding at least one of mobile device 510 or the user of mobile device 510. Compliance server 540 then determines whether mobile device 510 is authorized to access network resource 520 based on the extracted information and the enterprise service based information or the third party information.

After determining whether mobile device 510 is authorized to access network resource 520, compliance server 540 prepares an access decision based on the extracted information and the at least one of enterprise service based information and third party information. Compliance server 540 then stores stored the access decision in a database on the network, such as database 551. Compliance server 540 is also capable of storing the extracted information in the database.

The invention also relates to method for managing access to a network resource on a network from a mobile device, the method including the steps of intercepting a data stream from the mobile device attempting to access the network resource, submitting a query to a compliance server to determine whether the mobile device is authorized to access the network resource, receiving a response from the compliance server, and if the received response indicates that the query was not received by the compliance server, accessing a decision cache to determine whether the mobile device has been granted access or denied access during a previous attempt to access the network resource, and allowing or denying the mobile device access to the network resource in a manner consistent with the previous attempt.

According to this embodiment, if the network connection between the access manager and the compliance server is broken, for any reasons, the access manager accesses a decision cache, such as decision cache 131 in FIG. 1, decision cache 231 in FIG. 2A, decision cache 431 in FIG. 4, or decision cache 531 in FIG. 5A, and uses prior information regarding the mobile device to determine whether or not to grant access. The decision cache may include information such as prior instances of granted or denied access, etc. In addition, the information within the decision cache may be time stamped, such that older, less relevant information may be disregarded or ignored.

If, however, the access manager receives a response from the compliance device indicating that the mobile device is authorized, the access manager simply grants the mobile device access to the network resource. Similarly, if the access manager receives a response from the compliance device indicating that the mobile device is not authorized, the access manager simply denying the mobile device access to the network resource.

The invention also relates to a method for managing access to a network resource on a network from a mobile device in which the method includes the steps of intercepting a data stream from the mobile device attempting to access the network resource, submitting a query to a compliance server to determine whether the mobile device is authorized to access the network resource, receiving a response from the compliance server, and, if the received response indicates that the query was not received by the compliance server, granting the mobile device access to the network resource. This embodiment sets the default action by the access manager to allow the mobile device access to the network resource if the compliance server is unreachable.

Furthermore, the invention relates to a method for managing access to a network resource on a network from a mobile device in which the method includes the steps of intercepting a data stream from the mobile device attempting to access the network resource, submitting a query to a compliance server to determine whether the mobile device is authorized to access the network resource, receiving a response from the compliance server, and, if the received response indicates that the query was not received by the compliance server, denying the mobile device access to the network resource. This embodiment sets the default action by the access manager to deny the mobile device access to the network resource if the compliance server is unreachable.

In addition to the above-described embodiments, the invention relates to an In-Band Compliance Filter that intercepts Mobile Device accesses of Network Services, where the Compliance Filter intercepts and parses the stream, to extract identifying and other information. That information is used as part of a query to a Compliance Service which computes an Access Decision based on information stored in a Database, and logs the Access and the Access Decision. Optionally, if the Access Decision is Deny, the Access Decision may be enforced, by Denying the access (e.g., by terminating the connection) before the Network Service is actually invoked.

The Access Decision may depend on a Health Profile of the Mobile Device, the authenticity of the Mobile Device or the User on the Mobile Device accessing the Network Service, the authorization of the Mobile Device or the User on that Mobile Device to access the Network Service, as well as other Policies governing access to the Network Service (e.g., temporal or location based policies). Verifying authenticity, authorization, or other overlay policies may require consulting other services or databases that may be local or remote to the Compliance Filter and Compliance Service.

If the Compliance Service is not reachable by the Compliance Filter (e.g., because of communication issues), the Compliance Filter may use a previously cached Access Decision, or default to a policy determined Permit or Deny Access Decision.

The Compliance Service may furthermore modify the stream to replace elements of the stream (e.g., identification or authorization credentials) to transform the Mobile Device's request into one that may be effectively processed by the Network Service.

Thus, this invention utilizes a device to server communication system that employs the IP-based network features available on nearly all of the mainstream business-oriented devices on the market today. IP-based networks include such technologies as WiFi, ED-VO, and GPRS. The system has a fundamental assumption that communications should always be originated by the client device, and are generally initiated by a client device attempting to contact a network resource. This assumption is based on the nature of nature of the phone-based technologies like ED-VO and GPRS, wherein the phones are given IP address that may not be directly reached from the Internet. Sources on the Internet may reply to connections from the devices, but may not originate connections to the devices. It has been observed that some carriers allow devices to be assigned directly-addressable IP addresses. In reality, those carriers typically charge a premium for such service, and not many consumers would be willing to undertake the expense.

To mitigate the problem of the server not being able to originate communications to the device via IP, servers are commonly allowed to send SMS messages to the device, telling it to check in via IP. FIG. 6 illustrates the major components of this subsystem. In particular, the system 600 (the OTA Communications subsystem) consists of an enterprise server 610, a web-based provisioning system 620, a corporate firewall 630, a network 640, and a client device 650. The web-based provisioning system 620 includes a device communication service 621, which is located on the server side of the system. The client device 650 includes a download manager 651, a SMS listener 652, a compliance agent 653, and a policy manager 654.

Operation Scenarios

Device/Server communications occur in a number of different operational scenarios, laid out in the top row of the table below.

Enumerated Items:

| Action | Description |
| --- | --- |
| TestPopup | |
| Wipe | Indicates the device should execute an immediate wipe |
| GetPolicy | Tells the device to call GetPolicy to download the latest policy. |
| GetPackage | Tells the device to call GetPackage to download a file package, consisting of one or more files. |
| SendDetailedInfo | The device should send the server a list of detailed device information via the SendDetailedInfo call. |
| SendFile | Orders the device to send a specified file back to the server via the SendFile call. |
| Reset | Indicates the device should acknowledge the command and then execute a soft reset. The device should do a controlled shutdown (including re-encrypting any open files) before resetting, if such a thing exists for the device type. |
| ConfirmedWipe | Indicates the device should acknowledge the command before executing the wipe. |
| Unlock | Orders the device client to unlock itself, resetting any policy-based flag that forced it into the locked state (such as password attempts exceeded). |
| ReRegister | The device should run the DownloadManager, having the user re-register the device with the server. This will re-associate the device with the user. |
| CommandLine | |

| Dev Priority | Method | Initial Provisioning | EAS Compliance | Daily Compliance | Discovery | Policy Update | File Distribution | SMS |
| --- | --- | --- | --- | --- | --- | --- | --- | --- |
| 1 | DownloadChunk | X | | | | | X | |
| 1 | Register | X | | | | | | |
| 1 | CheckIn | | X | X | X | X | X | X |
| 2 | GetPackage | X | | | | | X | |
| 2 | GetPolicy | X | | | | X | | |
| 3 | AckAction | | | | X | X | X | X |
| 3 | UpdatePackageStatus | X | | | | | X | |
| 3 | SendDeviceDetailInfo | X | | | X | | | |
| 4 | UploadFile | | | | X | | | |

Initial Provisioning: The process of getting the software installed onto a device that does not have the client.
EAS Compliance: Executed whenever the device attempts to conduct an EAS transaction (at a defined minimum interval). The process of checking in with the server, passing in compliance data, and checking for any pending actions.
Daily Compliance: Executed at defined intervals, every 24 hours by default. The process of checking in with the server, passing in compliance data, and checking for any pending actions.
Discovery: Executed as a result of discovery actions transmitted in a CheckIn response.
Policy Update: Executed as a result of a GetPolicy action transmitted in a CheckIn response.
File Distribution: Executed as a result of a GetPackage action transmitted in a CheckIn response.
SMS: An SMS message may require an ActAction, plus possibly a CheckIn, depending on the actual command received in the SMS.

Operation Design—Protocol

Authorization/Authentication

Authorization/Authentication is handled in two different ways, depending on where in the lifecycle the system is operating.

Provisioning: During the Provisioning phase, the protocol uses the credentials of the device user, entered by the user in the Download Manager UI. The provisioning process results in a device password passed-back to the device for use on subsequent connections.

Normal operations: Anytime after being initially provisioned, the device will use the unique device ID obtained from the device, and the device password provided during initial provisioning. The credentials are passed by assigning an auth header to the client web service object.

Data Structures

Base Types

The following are enumerated types used by a number of different calls.

enum ActionType

Description: This enum lists the various device actions that may be commanded by the server.

enum TransmissionMethod

Description: This enum lists the communication channel from which an action command was received. This is of essence for audit purposes, and because we want to prevent certain commands from being executed twice because they were passed via multiple channels simultaneously.

Enumerated Items:

| Method | Description |
| --- | --- |
| OTA | Indicates the action command was received over the air, via an IP network channel. |
| SMS | Indicates the action command was received via an SMS message. | enum ScriptItemType

Description: This type enumerates the commands that may be found in a package installation script.

Public enum TDErrors

Description: This enum lists the various errors that may result from calls to this service.

Enumerated Items:

| Error Code | Description |
| --- | --- |
| Authorization | Returned when no authorization header was found on the method call. |
| InvalidPath | |
| FileNotFound | |
| InvalidDownloadOffset | |
| DatabaseError | |
| DataNotFound | |
| DirServerNotFound | |
| DirServerSearchError | |
| AuthParamMissing | |
| InvalidRegistration | |
| RegistrationError | |

Complex Types
ByteArrayReturnEntity
Description: This type is the result of a DownloadChunk call. It consists of an error element, and a data element.
Structure Elements:

| Type | Name | Description |
| --- | --- | --- |
| ErrorEntity | ErrorEntity | Indicates if any error occurred for this call. The boolean ErrorEntity.Error flag should ALWAYS be tested to see if an error was encountered. |
| byte[ ] | Value | The bytes returned for this call. Note that this may be less than buffsize in length. End of File will be indicated by receiving a partial or empty buffer. |

ErrorEntity
Description: This type is used by many different calls to return runtime error information.
Structure Elements:

| Type | Name | Description |
| --- | --- | --- |
| boolean | Error | If true, it indicates that there was an error on the call and the the client should process this error object. If false, there was no error, and the error object can be ignored. |
| enum TDErrors | ErrorCode | The error code for this error from the TDErrors enumerated type. |
| string | ErrorMessage | The string that describes the error condition. |

ActionEntity/ActionsEntity
Description: The ActionsEntity type is a sequence of zero or more ActionEntity entries. This type is returned by the CheckIn and Register calls to tell the client what actions are pending. The Register call will always have at least a GetPolicy and GetPackage action pending.
ActionEntity Structure Elements:

| Type | Name | Description |
| --- | --- | --- |
| string | ActionID | Serialized unique identifier (GUID) for the pending action. This ID will be sent back to the server when the action is completed, and is used for audit purposes. |
| enum ActionType | ActionType | The type of action that must be taken. |

-continued

| Type | Name | Description |
| --- | --- | --- |
| string | Action | Parameter for the action. This field is only required for a couple of the actions, such as CommandLine and UploadFile. For all other actions it will be empty. |

DeviceDetailInfoEntity
Description: This type is used to send the server detailed information about a specific device. It provides much of the information needed for device audit and vulnerability reporting, as well as critical information needed about the device platform and model for determining which fie packages should be sent to the device.
Structure Elements:

Essential elements are marked as mandatory; all others are highly desired but not required.

| Type | Name | Description |
| --- | --- | --- |
| string | DeviceID | Unique device ID for this device |
| string | Model | The model of this device |
| string | Platform | The device OS platform |
| string | Carrier | The carrier providing phone service for this device (if any) |
| string | PhoneNumber1 | The device phone number. Note that some devices may support more than one phone number and this field may be repeated for each. |
| string | PhoneNumber2 | The device phone number. Note that some devices may support more than one phone number and this field may be repeated for each. |
| string | ClientVersion | The version of PDASecure installed on the device (if any) |
| string | ROMVersion | The version of the ROM on the device |
| string | SDCardKey | The encryption key that PDASecure is using to secure SD Cards (if installed). |
| string | MemKey | The encryption key that PDASecure is using to secure main memory (if installed). |
| string | IMEI | The device IMEI. |
| string | ESN | The device ESN. |
| string | Location | The device geographical position in latitude/longitude |
| int | MemoryAvailable | The amount of free memory on the device |
| string | DetailedInfo | String from old GetDetailedInfo code. |

RegistrationEntity
Description: This type is the primary parameter of a Register call.
Structure Elements:

| Type | Name | Description |
| --- | --- | --- |
| string | UserName | The domain login username of the device user. |
| string | Domain | The domain login domain of the device user. |
| string | UniqueOrgID | If used by the organization, this field can contain extra login credential information, such as the user badge number, or Employee ID. See the Download Manager document for additional details. |

-continued

| Type | Name | Description |
| --- | --- | --- |
| DeviceDetailInfoEntity | DeviceDetailInfoEntity | A structure that contains detailed information about the physical device. |

RegistrationResponseEntity

Description: This type is the result of a Register call. It consists of an error element, and a data element.
Structure Elements:

| Type | Name | Description |
| --- | --- | --- |
| ErrorEntity | ErrorEntity | Indicates if any error occurred for this call. The boolean ErrorEntity.Error flag should ALWAYS be tested to see if an error was encountered. |
| ActionsEntity | ActionsEntity | List of actions that must be taken to complete registration. |
| string | pass | Server-generated device password that must be used for all subsequent connections that use device authorization credentials. |

ComplianceEntity

Description: This type is included in CheckIn calls, and is used to indicate the current state of device policy compliance.
Structure Elements:

| Type | Name | Description |
| --- | --- | --- |
| string | PolicyVersion | The version ID of the current policy. |
| string (GUID) | PolicyUID | The unique identifier for the current policy. |
| string | ClientVersion | The version of PDASecure installed on this device. |
| string | ComplianceData | An XML string of compliance state, mapped from compliance portion of policy. (Format TBD; should be blank until defined) |
| string | UserName | (Optional) The username pulled from the Exchange Activesync configuration. |

HeartbeatEntity

Description: This type is the result of a CheckIn call. It consists of an error element, and a number of data elements.
Structure Elements:

| Type | Name | Description |
| --- | --- | --- |
| ErrorEntity | ErrorEntity | Indicates if any error occurred for this call. The boolean ErrorEntity.Error flag should ALWAYS be tested to see if an error was encountered. |
| dateTime | TimeStamp | Server timestamp for this checkin. The most recent CheckIn timestamp should always be recorded |
| boolean | Compliant | A flag returned from the server to let the device know if it is considered compliant or not. If a device is non-compliant it will not be permitted to ActiveSync until it has been remediated. |
| string | ServerVersion | The version of software running on the server. |
| ActionsEntity | ActionsEntity | A sequence of zero or more actions pending for this device. |

PackageEntity

Description: This type is the result of a GetPackage call. It consists of an error element, and a number of data elements.
Structure Elements:

| Type | Name | Description |
| --- | --- | --- |
| ErrorEntity | ErrorEntity | Indicates if any error occurred for this call. The boolean ErrorEntity.Error flag should ALWAYS be tested to see if an error was encountered. |
| int | PackageID | The unique identifier for this package. |
| Files | Files | A sequence of PackageFile entries. |
| byte[ ] | Policy | The current policy for this device/user as an AES128 ENCRYPTED XML string (optional, except for initial provisioning). |
| Script | Script | The installation script for this package. |
| boolean | LastPackage | If this is TRUE, then this is the only package waiting for the device. If FALSE, then the device should install this current package, and then call GetPackage again for the next package. |

PackageFile

Description: This type describes a single file element returned in the PackageEntity type.
Structure Elements:

| Type | Name | Description |
| --- | --- | --- |
| int | FileID | The ID of the file on the server |
| string | FileName | The name of this file |
| string | FileRename | The name and path where this file should be stored. |
| long | Size | The size of this file in bytes |
| string | FileHash | The SHA1 hash for this file |

Methods

DownloadChunk

Definition: ByteArrayReturnEntity DownloadChunk(int FileID, long Offset, intBufferSize)
Parameters:

| | |
| --- | --- |
| FileID | ID number of the file to download. This number is found in the the results of the GetPackage call. |
| Offset | Indicates where in file to obtain data, indexed in bytes from start of file. |
| BufferSize | Number of bytes requested for return in this chunk. |

Result: Data is returned in the ByteArrayReturnEntity structure—an array of byte.

Description: This method is used to download files to the client. The client should call GetPackage to get a list of FileID's that should preferably be downloaded, along with their file size and a SHA1 checksum hash. The client should then use DownloadChunk to retrieve the file in pieces of size BufferSize. This method is intended to provide the ability to resume a failed download, as it lets the client start downloading the file from any point. This method may also be called in parallel, allowing the client to have several pending chunks at the same time. See the Download Manager documentation for the reasons why this might be desired.

Errors:

| Error | Caused by | Description |
|---|---|---|
| TDErrors.Authorization | Client | An authorization header was not found. |
| TDErrors.FileNotFound | Server | The FileID was legal, but the file associated with the FileID was not found on disk at the server |
| TDErrors.InvalidDownloadOffset | Client | The client tried to read an offset that was before the beginning of the file or past the end of the file. |
| TDErrors.InvalidPath | Server | Either (a) the FileID was found but did not contain a valid file path or (b) the FileID was not valid. |

Register
Definition: RegistrationResponseEntity Register(RegistrationEntity registrationEntity)
Parameters:

| RegistrationEntity | Structure containing user credentials and device description data. |
|---|---|

Result:
Data is returned in the RegistrationResponseEntity structure.

Description: This method is used to initially register the client with the server. Its two primary purposes are (a) to authenticate and associate the user with the device in a fashion that may not be repudiated, i.e., using their domain login credentials, and (b) to pass critical device configuration data to the server so the server may decide how to manage the device (such as which file packages should be associated with the device).

The method is also used to re-register the client with the server in response to a ReRegister action from Checkin. This may be needed if the device is physically transferred to another user, if the software is upgraded and requires special registration, or if the original user is transferred to another domain, auth server, etc.

Note that this method requires the USER's authentication credentials in the header.

Errors:

| Error | Caused by | Description |
|---|---|---|
| TDErrors.Authorization | Client | An authorization header was not found. |

CheckIn
Definition: HeartbeatEntity CheckIn(string DeviceID, ComplianceEntity ComplianceEntity)
Parameters:

| DeviceID | The unique ID of this device. |
|---|---|
| ComplianceEntity | A data structure that contains policy compliance information. |

Result: Data is returned in the HeartbeatEntity structure.

Description: This method is used to periodically "check in" with the server, pass compliance information, and learn of any pending actions. This call may happen fairly frequently, depending on how a customer has configured their compliance requirements. In a customer environment with EAS compliance enabled, the call will usually happen every time the user attempts to send or receive mail (at an interval of no less than five minutes by default). In an environment with or without EAS compliance, this call will be made every 24 hours.

This call will also be made after every time the device is soft reset, preferably as soon as the software is installed, but at the very least as soon as the user logs in. If the device is in Flight Mode, then the CheckIn should preferably be made as soon as the network is reestablished.

Errors:

| Error | Caused by | Description |
|---|---|---|
| TDErrors.Authorization | Client | An authorization header was not found. |

GetPolicy
Definition: StringReturnEntity GetPolicy(String DeviceID)
Parameters:

| DeviceID | The unique ID of this device. |
|---|---|

Result: The policy is returned as an unencrypted XML string in the StringReturnEntity structure.

Description: This method is used to download the current policy for this device. Note that the policy is downloaded in an unencrypted form, and so it should preferably not be written to "disk" on device—it should processed in memory.

Errors:

| Error | Caused by | Description |
|---|---|---|
| TDErrors.Authorization | Client | An authorization header was not found. |

GetPackage
Definition: PackageEntity GetPackage(string DeviceID)
Parameters:

| DeviceID | The unique ID of this device. |
|---|---|

Result: Data is returned in the PackageEntity structure.

Description: This method is used to download a list of files pending for installation. The download package contains a list of the files that should preferably be downloaded, along with a script that is broken into three sections: PreDownload, Download, and PostDownload. The script is stateful, in that the device should keep track of which commands have been completed and which have not. GetPackage should preferably be resumable, as some installations require device soft reset. The client should make a number of attempts to install software before failing the command.

Upon completion (successful or complete failure) of a given GetPackage call, the client should preferably provide feedback to the server via an UpdatePackageStatus call. Any policy obtained via GetPackage will be encrypted. The password to use for this encryption will defined in a different document. The device password must also be in the policy.

Errors:

| Error | Caused by | Description |
|---|---|---|
| TDErrors.Authorization | Client | An authorization header was not found. |
| TBD | Server | Package not found on the server |

AckAction

Definition: ErrorEntity AckAction(String DeviceID, String actionID, TransmissionMethod transmissionMethod, ErrorEntity actionError)

Parameters:

| | |
|---|---|
| DeviceID | The unique ID of this device. |
| actionID | The unique identifier of the action that the client is acknowledging. |
| transmissionMethod | The channel via which the action was transmitted to the device |
| actionError | |

Result: Any error is returned in the ErrorEntity structure.

Description: This method is used by the device to acknowledge receipt and/or execution of a specific action.

Errors:

| Error | Caused by | Description |
|---|---|---|
| TDErrors.Authorization | Client | An authorization header was not found. |
| | Server | Action not found on the server. |

UpdatePackageStatus

Definition: BooleanReturnEntity UpdatePackageStatus (string DeviceID, int PackageID, bool Completed, ErrorEntity PackageStatus, int LastFileID, int LastCommandID)

Parameters:

| | |
|---|---|
| DeviceID | The unique ID of this device. |
| PackageID | The unique ID of this package, obtained in GetPackage call. |
| Completed | Set to TRUE if the all files downloaded and the entire package script executed successfully. Set to FALSE if any of the preceding failed. |
| PackageStatus | |
| LastFileID | The FileID of the last file that was successfully downloaded. This is ignored unless Completed is FALSE. |
| LastCommandID | The last command that was successfully executed in the script. This is ignored unless Completed is FALSE. |

Result: Data is returned in the BooleanReturnEntity structure.

Description: This method is used by the client to send completion or error results back to the server for a specific GetPackage and DownloadChunk sequence of operations. If a GetPackage operation goes well, then this method tells the server that the specified package is installed and fully operational. Otherwise, it tells the server that the operation failed, and what the last successful command was.

Errors:

| Error | Caused by | Description |
|---|---|---|
| TDErrors.Authorization | Client | An authorization header was not found. |

SendDeviceDetailInfo

Definition: BooleanReturnEntity SendDeviceDetailInfo(DeviceDetailInfoEntity deviceDetailInfoEntity)

Parameters:

| | |
|---|---|
| deviceDetailInfoEntity | Full structure describing the device |

Result: Data is returned in the BooleanReturnEntity structure.

Description: This method is used to send detailed information about the device. This should be called automatically if the software detects that SIM has changed.

Errors:

| Error | Caused by | Description |
|---|---|---|
| TDErrors.Authorization | Client | An authorization header was not found. |

UploadFile

Definition: BooleanReturnEntity UploadFile

Parameters:

| | |
|---|---|
| DeviceID | The unique ID of this device. |

Result: Data is returned in the BooleanReturnEntity structure.

Description: This method is used to send a file from the device to the server in response to an UploadFile action.

Errors:

| Error | Caused by | Description |
|---|---|---|
| TDErrors.Authorization | Client | An authorization header was not found. |

Transport

Figure 7:
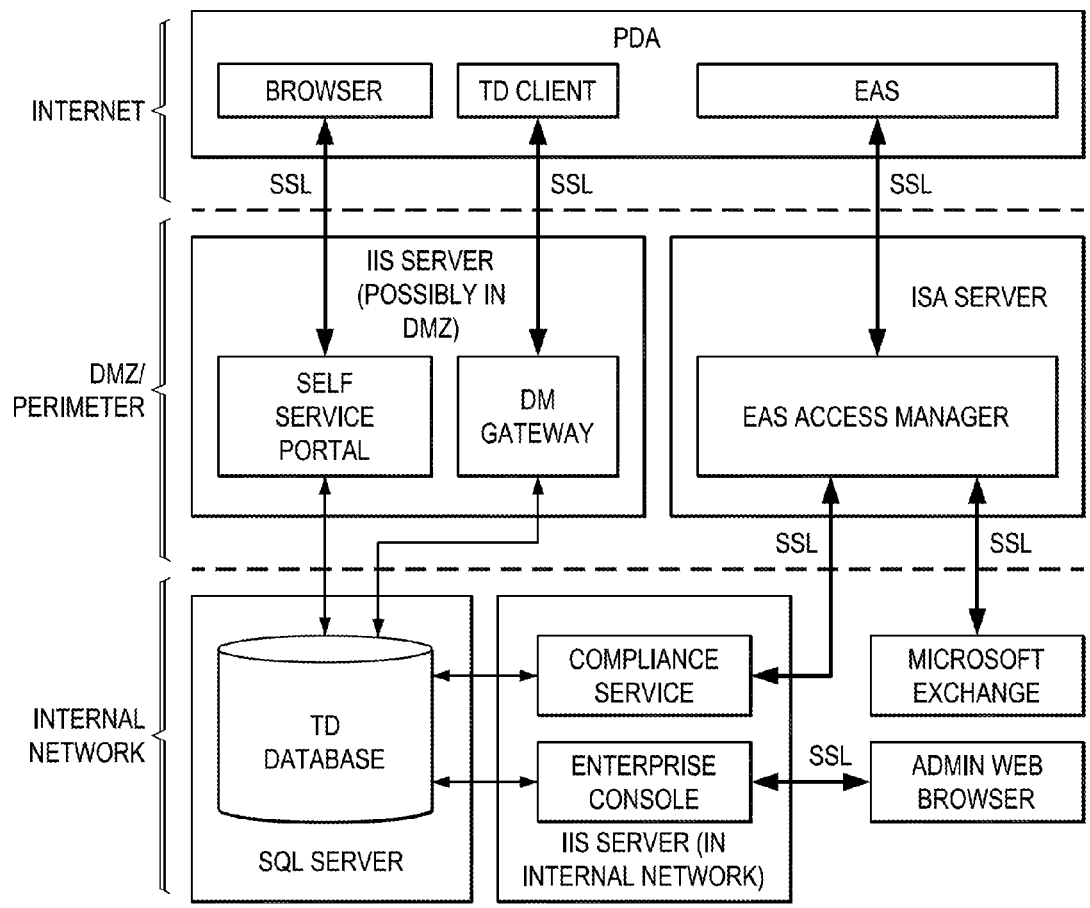
FIG. 7 illustrates an exemplary system of the invention according to a preferred embodiment.

The OTA Communication protocol of the invention is preferably implemented on top of a web services transport, implemented as Microsoft .NET 2.0 on the server. An exemplary system is shown in FIG. 7. Other acceptable foundations include custom IP-based protocols and other commercially-available communications infrastructure.

SMS Messaging System
Change History

| Date | Author/Editor | Description |
|---|---|---|
| Dec. 23, 2005 | Supernor | Initial draft |
| Jan. 31, 2006 | Supernor | Updated design |
| Mar. 1, 2006 | Supernor | Phase 1 draft submitted for review |
| Mar. 22, 2006 | Supernor | Added references. |
| Aug. 7, 2006 | Surafel | Changed GMT timestamp to ActionID |

Contents
SMS Messages and carriers:

http://tinywords.com/mobile.html
http://www.slipstick.com/outlook/smscell.htm
http://www.notepage.net/smtp.htm Email frominside.NET:

http://www.systemnetmail.com/
http://www.aspheute.com/english/20000918.asp
http://www.developer.com/net/asp/article.php/3096831
http://wwwAguysfromrolla.com/webtech/080801-1.shtml Terminology Server: A collection of modules which may be stored in the customer corporate infrastructure which may include the front end web server, back end database, provisioning portal etc.

Wireless data network: Either phone carrier/operator-based IP network or WiFi network.

Policy: A set of configuration items for the Client that control the security features that will be enforced on that client.

Mobile Device: Any portable computing device, such as a mobile phone, Palm, Pocket PC (2003 or M5), RIM or Symbian Device that can connect to wireless data network.

Client: Client on the mobile device. This client is an application/service that is installed on the Mobile Device, and fulfils at least one of the following functions: Secure control of the device, including user passwords and data encryption, Device feature control, including control of features like Bluetooth, WiFi, IR, etc., Application and image management, ensuring only the proper applications are able to be installed and operated, and Remote policy enforcement, allowing corporations to push a uniform policy to multiple devices.

Initial Connection: First sync from a device without security.

Subsequent Connections: All syncs after the initial installation of software and policy.

Admin: The administrator of the system. Preferably a corporate IT or security administrator.

User: The user of a device client—generally a person with relatively low privileges to change device configuration.

Wireless message: A message packaged for push to the client, typically an SMS, MMS, or similar message.

Protected Data: Data that is important enough to the user that it should be protected with encryption. Protected Data can only be read from/written to by Trusted Applications. Protected Data may be database records or flat files.

Trusted Applications: A specific set of applications that are allowed to read from/write to Protected Data files in their unencrypted forms Overview The system requires a mechanism to communicate urgent information and/or commands to devices that are being managed by a particular server. The normal channels of communication between the devices and the server are as follows:

PC Agent: For cradle-based sync.

WiFi-based wireless network: Typically used by PDA's in either a local/closed network or at a public WiFi hotspot.

Carrier/cellular operator wireless network: Used by PDA/phone devices that are equipped and provisioned to send/receive data.

The primary focus of this release is on the latter of these device types—phones. During normal operations of these devices, there is not normally a way for the server to communicate urgent information directly to the device via an IP-based network. This is because they are typically hidden behind a carrier or operator network firewall inside a private network that employs Network Address Translation (NAT). This means the devices can communicate to the Internet, but the Internet cannot typically reach the devices, except in response to a TCP request. Some competitors deal with this issue by dictating that their software should preferably be installed INSIDE the carrier network, in a place where they may directly communicate with the devices. This requires a tremendous amounts of partnering efforts to reach all needed carriers, a system that requires truly massive scalability and reliability, and will not appeal to the enterprises that want to manage devices from multiple carriers at the same time. The system of the invention work around the NAT issue to issue urgent device commands.

In particular, the systems of the invention employ Short Message Service (SMS) messages to issues commands to phone-equipped devices. SMS commands have the advantage of completely bypassing the carrier IP network, and riding instead of the phone service. They also have some known disadvantages. They are usually not free, unless one is already paying for unlimited SMS messages (we do not expect our customers to being doing this—after all, they have "normal" email on the devices). They are extremely limited in size, with a maximum payload of 140 bytes. Delivery is not guaranteed. (The SMS messages would be sent via normal email, queued in the carrier network, and the device would have to be turned on within a few days in order to receive the message before it times out.). Not all devices are equipped or provisioned to receive SMS messages (like PDAs).

Notwithstanding these (and other) disadvantages, SMS capability is important for those devices that ARE equipped and ARE provisioned, if for no other reason than it is a "standard" feature provided by our competitors.

Some of the required SMS commands are relatively benign, like simply commanding the device to check in with the server via normal networking services. However, there are also commands that could be highly risky if a hostile third party were able to issue them on demand. These include such commands as Wipe, LockDevice, or ChangePassword. All three of these particular commands could deny access to the device by the owner, and the first would destroy data. These commands all need to be protected with security features that provide Authentication that the message is from an authorized source and Encryption to hide the message being sent and to protect the Authentication mechanism. They should preferably also defend against attacks such as Replay.

The following descriptions outlines the high level requirements of the core SMS mechanisms and provide a high-level design.

Architecture

Figure 8:
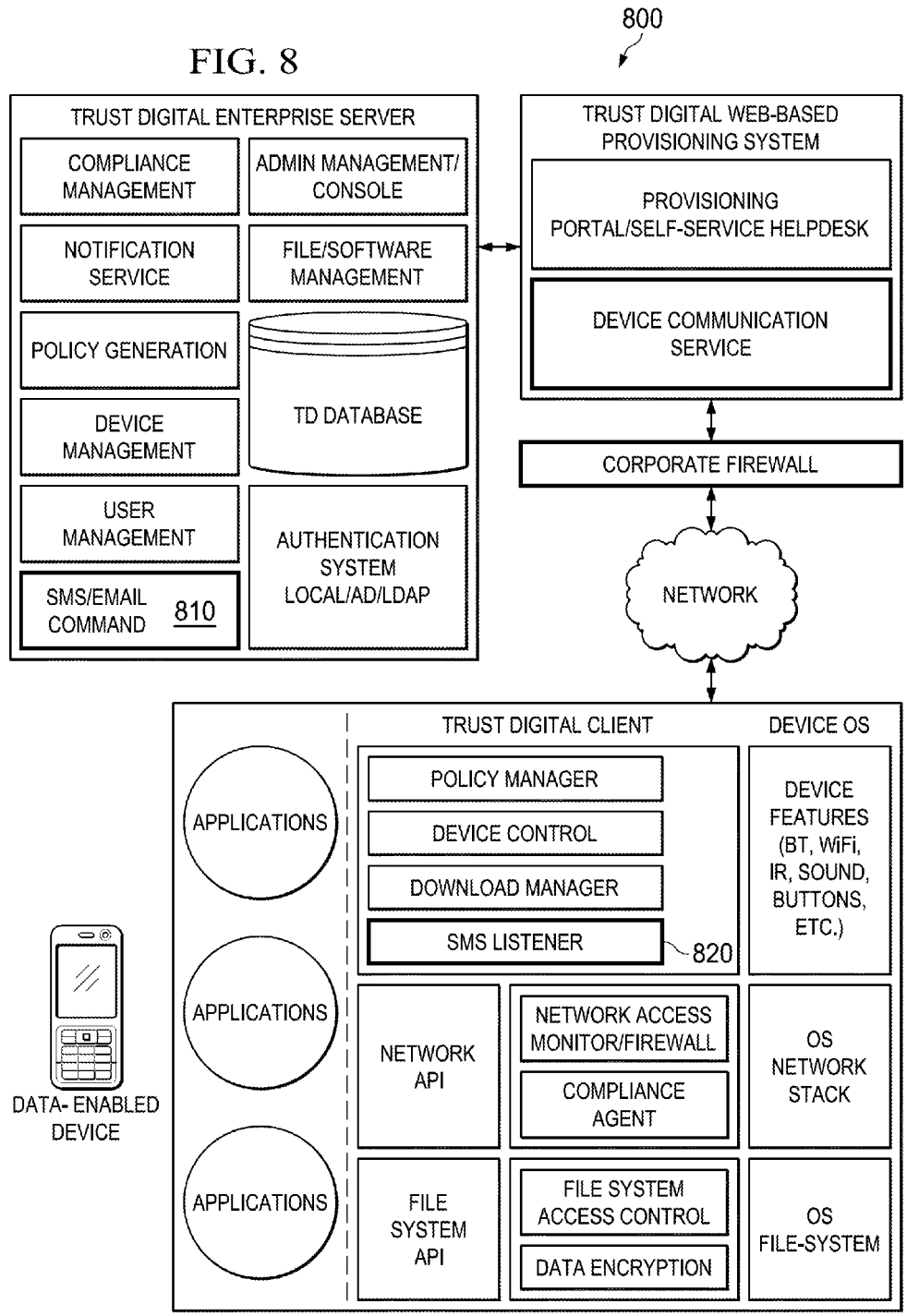
FIG. 8 illustrates an exemplary system of the invention according to a preferred embodiment.

The major components of this subsystem, which is shown in FIG. 8 as system 800, include, on the server side, SMS/Email Command Service 810, and, on the client side, The SMS Listener 820.

SMS Operation Scenarios

Wipe

User calls IT Helpdesk and tells them he lost his device, leaving it on the seat of a taxicab. He attempted to contact the cab company but they say they cannot find the device. The device is presumed to be gone forever. IT Helpdesk finds the user and device in the Enterprise Console and clicks the Wipe button. Server sets the Wipe state against the device in the database. The device is also set to "non-compliant" in the database so no new PIM data will flow to the device. SMS Service checks to make sure the organization has SMS messages configured for Wipe. If so, a message is generated and encrypted.

The message takes the form of an email that is addressed to the publicly-visible SMS address of the device (commonly the device phone number@ the carrier SMS address, like 5552223333@vtext.com (verizon). The SMS Service sends the message. The carrier network receives the message and stores it for an unknown period (possibly 24-48 hours) if the device is not online. When the device comes online, the carrier network forwards all pending SMS messages to the device.

The device receives the SMS message, and the message is passed to the SMS Listener component for possible handling. The SMS Listener examines the message to see if it looks like an authentically generated message. Messages generated by the system will have unique characteristics that should make it unlikely/nearly impossible for the Listener to intercept a message that was not intended for it. The SMS Listener determines that this IS an authentic message, and decrypts, validates, authenticates, and parses it. The SMS message is recognized as a Wipe command. The SMS Listener executes a secure wipe of the device using whatever mechanism is already implemented by the code for that particular device/platform.

Wipe with Receipt

Very much like above, except that this organization desires a slightly higher level of certainty that the device is in fact wiped. When the SMS message is recognized as a Wipe with Receipt command, the SMS Listener attempts to contact the server via IP-based networking, informing it that the Wipe command was received. If the SMS Listener is not able to contact the server for a specified time period, then the Wipe command will be executed without issuing a receipt.

Device Lock

The employee who uses this device is in the process of being laid-off. The device contains data that may be of interest to the company, and the company does not want this data destroyed by the user. The company issues a command to the device for it to be locked to prevent the user from logging in. When the SMS Message is recognized as a Lock command, the SMS listener causes PDASecure to lock the device in a fashion similar to the mechanism used for password-attempts exceeded.

No Authentic Software Installed

If the device is hard reset and authentic software is not re-installed, then the SMS Listener will not be in a position to intercept the SMS Message on the device, and the user will see the message. In this case, the SMS message includes a plain-text prefix that is human-readable, such that the user sees an SMS message that looks something like the following:

System Message-OK to
delete
TdGggYWxsIG15IHN0dWZm
ZWQgYW5pbWFscy4gSSB3b
3VsZCBsaXN0ZW4gdG8gdG
hlaXIgaGVhcnQgd2l0aCB
teSBzdGV0aG9T Urgent Policy Update An organization makes a policy change that needs to be pushed out to devices immediately. Policy change is made and admin selects "urgent" checkbox when applying policy. UI backend. UI backend sends a message to the SMS Service SMS Operation Design—Communications Message Format Transmission of the short messages between SMSC and phone is via SS7 within the standard GSM MAP framework. Messages are sent with the additional MAP operation forward_short_message, whose payload length is limited by the constraints of the signalling protocol to precisely 140 bytes. In practice, this translates to either 160 7-bit characters, 140 8-bit characters, or 70 2-byte characters in languages such as Arabic, Chinese, Korean, Japanese or Slavonic languages (e.g. Russian) when encoded using 2-byte UTF-16 character encoding (see Unicode). This does not include routing data and other metadata, which is additional to the payload size.

The diagram below breaks-down the 140 byte SMS message by how we will use it. This arrangement will allow for a 48-character 7-bit user-visible message, or a 21-character 2-byte Unicode user-visible message.

| | Offset Bytes | | | |
|---|---|---|---|---|
| 0 | 4 | 8 | 12 | 15 |
| 0 | User-visible message (40 bytes), padded with spaces | | | 15 |
| 16 | User visible message (continued) | | | 31 |
| 32 | User visible message (continued) | \n\n (two newline characters) | T (One hardcoded character) | Command ID (19 characters) | 47 |

-continued

| Offset | Bytes | | | |
|---|---|---|---|---|
| 0 | 4 | 8 | 12 | 15 |
| 48 | Command ID (19 characters) (continued) | | Command code from list below (one character) | Command parameters (up to 76 characters) - padded with a newline character and then random nonzero bytes | 63 |
| 64 | Command parameters (continued) | | | 79 |
| 80 | Command parameters (continued) | | | 95 |
| 96 | Command parameters (continued) | | | 111 |
| 112 | Command parameters (continued) | | | 127 |
| 128 | Command parameters (continued) | | T (One hardcoded character) | 139 |

Putting this in the form of byte offsets and sizes:

| Bytes | | | | |
|---|---|---|---|---|
| Start offset | End offset | Size | Encrypted size | Description |
| 0 | 39 | 40 | 0 | User-visible message, padded with spaces |
| 40 | 41 | 2 | 0 | Two newlines |
| 42 | 42 | 1 | 0 | Hardcoded "T" |
| 43 | 61 | 19 | 19 | Action ID of the command (from Action table in db) |
| 62 | 62 | 1 | 1 | Command Code |
| 63 | 138 | 76 | 76 | Parameters, terminated by a newline and padded with random bytes. |
| 138 | 139 | 1 | 0 | Hardcoded "T" |
| | Total | 140 | 96 | |

As may be noted, this will result in an encrypted data size of 96 bytes, which could be broken (if necessary) into six 16 byte blocks or three 32 byte blocks, etc.

The following are the command codes, which are generally case sensitive.

| Command Code | Short name | Definition | Parameters |
|---|---|---|---|
| C | CheckIn | Order the device to check-in with the server via the normal network and download instructions. | |
| w | Wipe | Orders the device client to wipe all data on the device. | |
| W | WipeWithReceipt | Same as above, but FIRST attempt to contact the server via normal network and confirm receipt of the WIPE command. If the device is unable to establish a connection within the timeout specified in the parameters, then wipe without connecting to the server. If a timeout of zero is specified, make one attempt to contact the server and then wipe. | Timeout in minutes, 0-10080 (one week). |
| L | LockUser | Orders the device client to lock the device and prevent user login. Optional: If the user attempts to login, he/she should be told that the device is locked and that they should contact the system administrator. Note that this is similar to the existing state that allows for the device to be locked if the user fails to enter the correct password, x times in a row. | |
| U | UnlockUser | Orders the device client to unlock itself, resetting any policy-based flag that forced it into the locked state (such as password attempts exceeded). | |
| P | ChangePassword | Forces a change to the device user password to some new password contained in the command. | Admin password, new user password |

-continued

| Command Code | Short name | Definition | Parameters |
|---|---|---|---|
| A | ServerAddress | New server protocol, IP address, port, such as HTTPS://70.21.119.2:9999 | Protocol, address, port |
| L | ServerURL | New server URL | URL |
| R | SoftReset | Order device to soft reset | |
| T | TestMessage | Display a test message | Message to display |

SMS Operation Design—Server

Server-Side Configurable Settings

The following SMS-related items may be configured on the server on a GLOBAL basis:

| Item Name | Data type | Description |
|---|---|---|
| SMTP server | IP Address or fully-qualified hostname | Address/URL of the SMTP server to which all SMS messages should be sent for forwarding. |

The following SMS-related items may be configured on the server on a PER ORGANIZATION basis:

| Item Name | Data type | Description |
|---|---|---|
| SMS messages enabled | boolean | An overall flag for the organization that indicates if they want to use SMS messages. |
| User message prefix | String | String that would be display to user if they ever saw an SMS from the software of the invention. Default value: "System Message-OK to delete". This field is limited to a maximum length of 48 7-bit ASCII characters, 42 8-bit characters, or 21 doublebyte Unicode characters. |
| User message prefix character set | String | For the current release: "7-bit US-ASCII" For a future release: Other standard character sets as dictated by PM. |
| "From" address | string | Email address to use for the "From" address of the SMS message. |
| SMS Wipe enabled | boolean | If a Wipe command is set for a device, send the message via SMS |
| SMS Wipe with Receipt enabled | boolean | This is a modifier for the previous command - if SMS Wipe is enabled and this selection is enabled, then attempt to get a wipe command receipt before actually wiping (see details below). |
| SMS Lock enabled | boolean | If a Lock command is set for a device, send the message via SMS |
| SMS Unlock enabled | boolean | etc. etc. |
| SMS Change Password Enabled | boolean | etc. etc. |
| SMS Server Address Change Enabled | boolean | etc. etc. |
| SMS Server URL Enabled | boolean | etc. etc. |
| SMS Soft Reset Enabled | boolean | etc. etc. |
| SMS Checkin Enabled | boolean | General notification message. If a policy or other file upload/download is pending for a device, and the device should contact the server via the normal IP-based network, send a message via SMS. |

SMS Database Features

The Device table should preferably be modified to include flags and associated timestamps for each of the possible SMS commands. Triggers will be placed against each of the commands.

Server Design

The SMS Service should preferably consist of a .NET web service that monitors the database, and constructs an SMS message when required.

The SMS Service should preferably support the following methods:

Standard service commands: Stop, Restart, HealthCheck

Special commands: SendMessage(DeviceID, Message) SendMessages(OrgID)

Audit

The SMS Service will log each time an SMS message is sent. The log item will include a timestamp, the Device ID to which the message was sent, and the command type.

Scope of Effort—Server

All of the server features described above will be implemented in two phases in this release. The first phase should preferably consist of all described features and capabilities, EXCEPT for SMS encryption. The second phase will consist of implementing SMS Encryption.

Construction and transmission of the SMS messages themselves will be based on the built-in System.Net.Mail and SmtpMail packages/classes of .NET 2.0, for example.

SMS Operation Design—Client

Client Design

Figure 9:
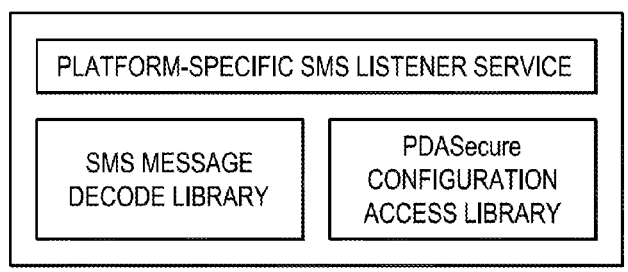
FIG. 9 illustrates an exemplary design configuration be used by SMS Listeners on device clients according to a preferred embodiment.

The basic design shown in FIG. 9 is preferable for all SMS Listeners on the device clients. The client should preferably consist of the following basic modules:

Platform-specific SMS Listener Service: This module contains the logic necessary to start and run the client, and any device-or-platform specific code required to actually listen for incoming SMS messages. The service should preferably be implemented in such a way that there is no danger of missing any incoming SMS messages. In other words, if the device SMS listening methods require that the service always be running, then the service should preferably be implemented in such a way that it will always load on boot and cannot be killed. If the listening methods do not require the service to always be running (such that an incoming message will cause the service to be started), then the service need only register itself for proper invocation.

SMS Message Decode Library: This module should preferably be a static library that provides the methods required to recognize and decode and decrypt incoming SMS messages. Insofar as possible, the library will be implemented in a platform-independent fashion.

PDASecure Configuration Access Library: This module should preferably be a static library that implements any code needed to access PDASecure settings or configuration data.

SMS Message Decode Library Public Methods

The following methods are implemented by this library:

bool HandleMessage(unsigned char *pstrMessage, unsigned char *pstrCryptoKey)

Description: Handles the message pointed to by the parameter. This method will validate that this message is a SMS message, and decrypt it and parse it if it is. The calling application should immediately call IsMessageValid( ) after calling HandleMessage to determine if this is a valid message. Invalid messages should be ignored by the system.

Parameters:

pstrMessage: Pointer to an array of char that contains the message.

pstrCryptoKey: Pointer to the encryption key for the message. This may be NULL for the first phase of this feature.

bool IsMessageValid( )

Description/return values: Returns true if the message was handled by the library. If possible, the calling code should make sure this message does not get exposed to the user. Returns false if the message was NOT handled by the library. The calling code should allow the message to reach the user.

SMSCommand enum getCommand( )

Description/return values: Returns an enumerated value that describes the command that was sent in the message. See SMSDefines.h for all values. If the returned command has parameters, the calling program should call the appropriate parameter retrieval command, as follows.

string getTestMessage( )

Description/return values: Assuming this was a TestMessage command, the method will return the test message string parameter. If this was not a TestMessage command, the string "Not a TestMessage command" will be returned.

Scope of Effort—Client

All of the server features described above will be implemented in two phases in this release.

Phase 1: Implement overall design for Palm and PPC, and command implementation for the following commands: Wipe, Lock, Unlock, TestMessage. The assumption is that the first phase can be done without the OTA Networking features that are being defined as a separate work task (needed for the CheckIn command).

Phase 2: Implement the CheckIn command and SMS Encryption.

SMS Security Requirements

The SMS Security subsystem has the following requirements: scalable, risk of spoofed messages from hostile 3rd party is absolutely minimal, risk of disclosed security keys minimal, low impact to user, and ability to protect all of the required commands.

SMS Security Design

The SMS Security subsystem has the following requirements: Use server+device timestamp successful sync, device ID, and policy ID to encrypt/authenticate contents.

Over the Air Policy (0 TAP) Communications

Overview

The client requires a new Over the Air Policy (OTAP) communications method that addresses these issues. At the high level, this method should preferably have the following functions:

The server should preferably allow for the creation of a single policy that will apply to a group of devices. (The admin may perceive this in the user interface as a single policy— Policy Editor requirements are covered in a separate document)

Allow for policy generation of this policy on a one policy file per device basis, where each generated policy file can be distinctly encrypted and protected uniquely for the target device.

Legacy support: Allow admin to configure system to continue to support the functionality of a single policy file for multiple devices.

Support pushing of policy files to devices independent of 3rd-party OTA vendors

Legacy support: Support pushing of policy files via 3rd-party OTA vendors

Support pushing of client status, logs, and compliance information back to the server.

The software of the invention is preferably installed in a corporate environment; thus, a carrier network component is not necessarily required. Because of this environment restriction, and due to carrier/operator network restrictions, the server may not initiate IP-based connections to the client. To mitigate this restriction, the system should preferably support the use of wireless messaging, such as SMS or MMS, to command or notify the client that it needs to contact the server via an IP-based network. All IP-based connections should preferably be initiated by the client.

Architecture

The intent of this document is describe the requirements of an area of product functionality. In order to better describe this functionality, the document may speak of specific product components as if they were designed modules. This document is not intended to be a constraint on design unless explicitly stated. Good design will result in a proper modular architecture, and modules from this document may be combined or further segmented in the final product.

Figure 10:
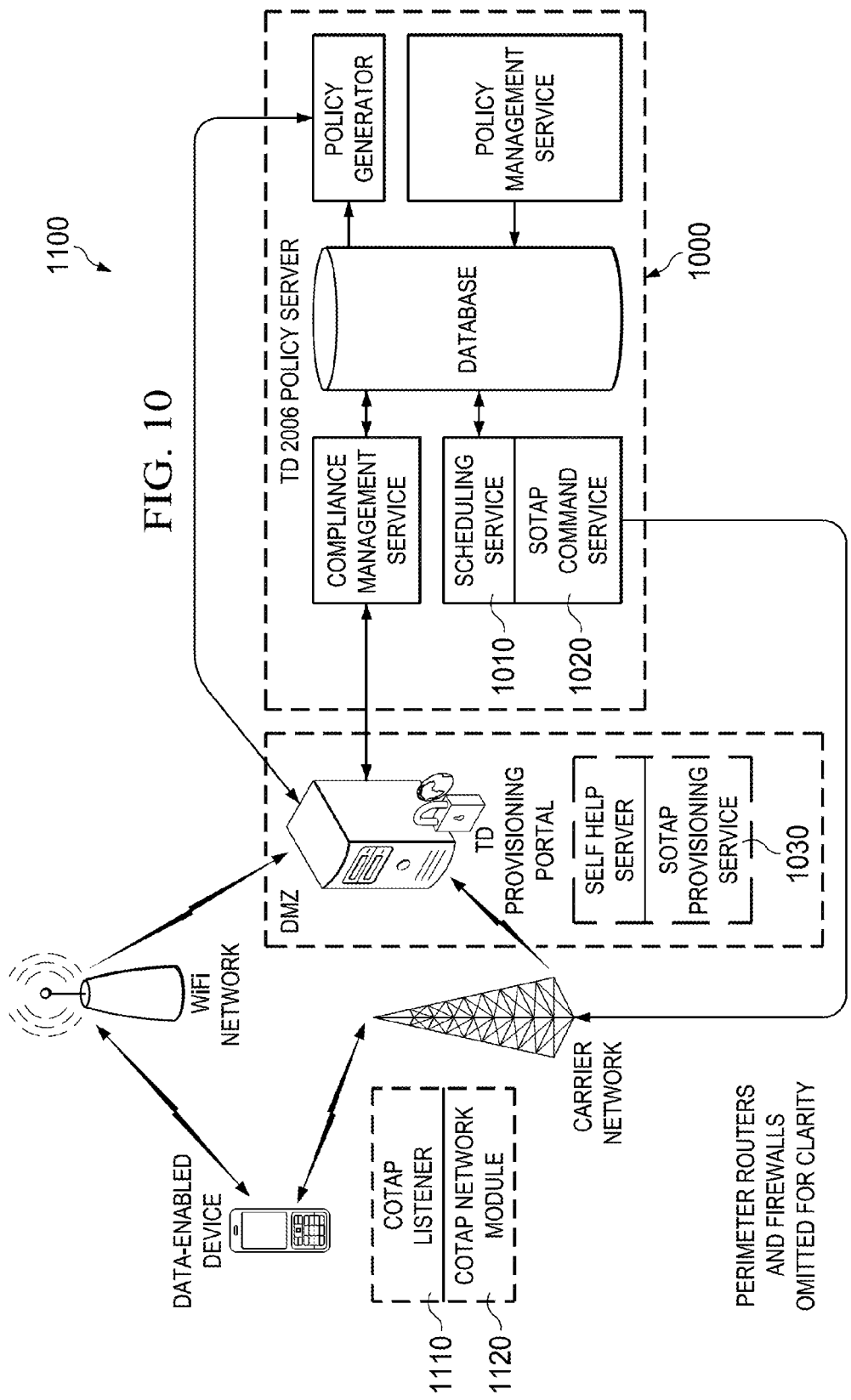
FIG. 10 illustrates an exemplary system of the invention according to a preferred embodiment.

The major components of this wireless push subsystem are shown in FIG. 10. On the server side, server OTAP (SOTAP) components 1000 include a Scheduling Service 1010, a wireless SOTAP Command Service 1020, and a SOTAP Provisioning Service 1030. On the client side, the client OTAP (COTAP) components 1000 include a wireless messaging listener service, the COTAP Listener 1110, and an IP-based network communication service, the COTAP Network Module 1120.

Wireless Push Subsystem Scenarios

Policy Push Scenario

The system should preferably support pushing of policy to devices on demand. The typical push scenario concept of operations is as follows: Policy is changed on the server, saved to the database, and "Applied" to a device or set of devices. The Scheduling Service will recognize that policy for a specific device has changed and will schedule transmission of a wireless message to the device. Per the schedule, the SOTAP Command Service sends a wireless message (SMS, MMS, etc.) to the device, containing a DownloadFile command, commanding it to download a new policy. Note that the SOTAP Command Service does NOT actually transmit the policy, but rather sends a notification that a policy is available and should preferably be downloaded. On the device, the COTAP Listener recognizes the incoming incoming wireless message as a Command, and processes that message. In the case of policy push, the message is recognized as a DownloadFile command, and the COTAP Network Module is commanded to contact the server to download policy. The COTAP Network Module activates the wireless data network connection if necessary, establishes a connection with the SOTAP Provisioning Service, and downloads the new policy. The COTAP Network Module notifies the Client that a new policy is available. The Client processes this policy, rebooting the device if necessary. Upon completion of new policy installation, the Client notifies the COTAP Network Module that a new policy has been installed. The COTAP Network Module activates the wireless data network connection if necessary, establishes a connection with the Policy Provisioning Server, and tells it that the Policy was Applied.

Command Push Scenario

In addition to the DownloadFile command, the system should preferably support pushing of other commands to devices on demand. These commands will include the following:

WipeDevice—Orders the device client to wipe all data on the device. This is typically done by forcing a device hard reset. Note that this particular command can only acknowledge receipt—it cannot provide later feedback.

WipeDeviceWithReceipt—Orders device to attempt to contact server, acknowledging receipt of the command before actually killing the device.

LockDevice—Orders the device client to lock the device and prevent user login. If the user attempts to login, he/she should be told that the device is locked and that they should contact the system administrator.

UnlockDevice—Orders the device client to unlock itself, resetting any policy-based flag that forced it into the locked state (such as password attempts exceeded).

ChangePassword—Forces a change to the device user password to some new password contained in the command.

ServerAddress—Configure the server address for the SOTAP Server

ServerURL—Configures the connection settings for the SOTAP Server

SoftReset—Orders device to soft reset.

All of these commands are preferably processed by the client as soon as they arrive, and do not require the user to log in for the commands to take effect. In some cases, they may force an immediate logout (such as LockDevice or KillDevice).

In general, the scenario for command push is as follows. A Command is ordered on the server for the specific device. The Scheduling Service treats all commands as Immediate Priority, and schedules them to happen as soon as possible. Per the schedule, the SOTAP Command Service sends a wireless message (SMS, MMS, etc.) to the device, containing the specific command along with any other needed data (such as a new password for the ChangePassword command). On the device, the COTAP Listener recognizes the incoming incoming wireless message as a Command, and processes that command, taking whatever action is necessary. For all of the commands except KillDevice, the COTAP Network Module activates the wireless data network connection (if necessary), establishes a connection with the Policy Provisioning Server, and informs it that the command has been obeyed.

Wireless Push Subsystem Requirements

Given the above scenarios, the wireless push subsystem preferably has the following features: The client portions of this subsystem should support the following device platforms: Pocket PC 2003, Windows Mobile 5, RIM, Palm 5, Symbian 7.0, 7.0s, and 9.0. The system should provide a distinct Provisioning Server component, the SOTAP Provisioning Service that may be installed in the corporate network DMZ. This Service is intended to isolate the internal Server components from the Internet. The server should preferably support pushing of commands and policy files to devices independent of 3rd-party OTA vendors.

Wireless Commands

Any Command in transit to the device should preferably be protected by encryption and authentication. All Commands, command data, and authentication/encryption data should preferably fit within an SMS message, and contain data suitable for SMS transmission. The device will avoid having any policy file in an actual file form in the device file system. If the policy must be stored temporarily as a file, it should preferably be protected from deletion by a malicious user.

"On demand" push commands will be either "normal" priority or "immediate" priority. Normal priority push will be scheduled so as to control the number of devices attempting to contact the server at the same time. Immediate priority push will be scheduled to occur as soon as possible. Note that if immediate push is requested for many devices simultaneously, it will have a similar result to normal priority, in that the devices will be scheduled over a period of time (though the immediate push may be scheduled ahead of existing normal priority pushes).

The scheduler should preferably track and log the following push states on a per-device basis: Push Scheduled, Push Rescheduled, Command Sent, Command Acknowledged, Command Failed on Device, Command Failed in Network.

The scheduler should preferably track the number of commands scheduled for a period of time, and reschedule them as necessary to spread server and network loading and ensure timely delivery of commands.

Commands should preferably be serialized, such that the Client OTA Network Module can acknowledge receipt of a specific command.

Policy Handling and Policy Push

The server should preferably allow for the creation of a single policy that will apply to a group of devices. Also, the server should preferably support policy generation on a one policy file per device basis, where each generated policy file can be distinctly encrypted and protected uniquely for the target device. In addition, the server should preferably support policy generation on a one policy file for multiple devices basis, where each generated policy file may be applied to multiple devices. Moreover, administrators should be allowed to configure the system to enable/disable support the functionality of a single policy file for multiple devices on a system or device group basis. Also, the system supports pushing of policy files via 3rd-party OTA vendors.

The system will track the following policy states on a per-policy basis: changed ("dirty" on the server), applied (commanded for push to devices). The system will also track the following policy states on a per-device basis: applied, pending. Furthermore, the system will track each time a device was supposed to receive policy, and will be able to flag a device that has been pending for more than 24 hours (a policy compliance "caution" state), or 72 hours (a policy compliance "danger" state). These times are defaults but should be configurable by the user.

If a device is in a Caution or Danger policy compliance alert state, and a new policy is applied, the device will remain in (and progress thru) the alert states until a policy is successfully applied.

The server should be able to revert any changed but not-applied policy to its applied state. The server should preferably log each time it is contacted by a device, and display it as a "last heard from" time. Once a policy has been applied, it may not be reverted—it can only be changed again. Policy applications should preferably be serialized; the server should preferably track which version of a policy is installed on a per-device basis.

This version of the system should preferably NOT maintain a policy history, allowing for multiple revisions of policy "undo". ALL policy changes in a given "Apply" on the server should preferably be logged in a text-based logfile. The scheduler should preferably recognize if a Policy Applied message is not received from the device within a configurable time period and retransmit the command.

The COTAP Network Module will include a COTAP Scheduler component that may be configured to contact the server on a periodic basis (such as "every 24 hours"), and attempt to retrieve policy. (Primarily intended for devices that do not support SMS, but may be used as a client heartbeat as well). The frequency of this client-side check should be settable on the server. The client should preferably be configurable to take various actions (such as lock, wipe, etc.), after a certain number of days with no contact with the server. All server components should preferably be implemented using Microsoft-based server products, including Windows Server 2003 and IIS. The server should preferably be stateless outside a single connection, and should preferably be infinitely scalable via standard MS IIS clustering techniques.

OTAP File Transfer Requirements

The COTAP Network Module should preferably allow for periodic transmission of other files to the server, as requested by other client modules. These files could include device logs or device compliance information.

The COTAP Network Module should preferably retrieve a "download list" from the SOTAP Provisioning Service. This download list will include a sequenced list of files that should preferably have action taken against them. The download actions should preferably include a simple DownloadFile action that simply downloads and copies the file to a specified location, an InstallApp action that downloads and installs an executable file, an InstallPolicy action that downloads and installs a policy (per the previous section of this document), an UninstallApp action that uninstalls the specified application, a DeleteFile action that deletes a specified file, a Soft-Reset action that commands a soft reset of the device, and a RunApp action that causes a specified application to execute in a non-blocking fashion.

The OTAP system also supports automatic resumption of interrupted downloads.

What is claimed is:

1. A server, comprising:
a processor, wherein the server is configured for:
selecting a command of one or more commands for a mobile device;
constructing a wireless message for the mobile device, the wireless message including a command code associated with the command;
assigning a first type of priority to the wireless message, wherein the first type of priority is higher than a second type of priority assigned to other messages that do not include the one or more commands; and
initiating a communication link to the mobile device, wherein the initiating includes sending the wireless message to the mobile device via a wireless network, wherein the command code is recognizable to a listener component on the mobile device to perform an action on the mobile device.

2. The server of claim 1, wherein the server is further configured for:
provisioning client software for the mobile device in order to interact with the server.

3. The server of claim 1, wherein the one or more commands comprise:
a) a command that the mobile device should execute a wipe of certain data, which is resident on the mobile device;
b) a command to download a current security policy for the mobile device;
c) a command to provide device details associated with the mobile device for performing a device audit of the mobile device;
d) a command to provide information associated with vulnerability reporting associated with the mobile device;
e) a command to lock the mobile device;
f) a command to send a specified file back to the server;
g) a command to execute a soft reset of the mobile device;
h) a command to unlock the mobile device;
i) a command to reset a policy-based flag that forced the mobile device into a locked state; and
j) a command for the mobile device to run a manager program to register the mobile device with the server.

4. The server of claim 1, wherein the server is further configured for:
communicating a particular policy to the mobile device using a push protocol.

5. The server of claim 4, wherein the particular policy applies to a plurality of mobile devices.

6. A method to be performed in conjunction with a processor operating in a computing device, comprising:
selecting, by the processor of the computing device, a command of one or more commands for a mobile device;
constructing a wireless message for the mobile device, the wireless message including a command code associated with the command;
assigning a first type of priority to the wireless message, wherein the first type of priority is higher than a second type of priority assigned to other messages that do not include the one or more commands; and
initiating a communication link to the mobile device, wherein the initiating includes sending the wireless message to the mobile device via a wireless network, wherein the command code is recognizable to a listener component on the mobile device to perform an action on the mobile device.

7. The method of claim 6, further comprising:
provisioning client software for the mobile device in order to interact with the server.

8. The method of claim 6, further comprising:
communicating a particular policy to the mobile device using a push protocol.

9. The method of claim 8, wherein the particular policy applies to a group of mobile devices.

10. A non-transitory media encoded with logic which, when executed by a processor, performs operations comprising:
selecting a command of one or more commands for a mobile device;
constructing a wireless message for the mobile device, the wireless message including a command code associated with the command;
assigning a first type of priority to the wireless message, wherein the first type of priority is higher than a second type of priority assigned to other messages that do not include the one or more commands; and
initiating a communication link to the mobile device, wherein the initiating includes sending the wireless message to the mobile device via a wireless network, wherein the command code is recognizable to a listener component on the mobile device to perform an action on the mobile device.

11. The media of claim 10, the operations further comprising:
provisioning client software for the mobile device in order to systematically interact with the server.

12. The media of claim 10, the operations further comprising:
communicating a particular policy to the mobile device using a push protocol.

13. The media of claim 12, wherein the particular policy applies to a group of mobile devices.

14. The media of claim 12, the operations further comprising:

providing an access decision based, at least in part, on third-party information.

15. The server of claim 1, wherein the server is further configured for:
setting information in a database, the information including an item that indicates the command is to be performed on the mobile device, wherein the command is selected based on the information in the database.

16. A system, comprising:
a short message service (SMS) command service running on a processor of a server, wherein the SMS command service is configured to:
select a command of one or more commands for a mobile device;
construct an SMS message for the mobile device, the SMS message including a command code associated with the command; and
assign a first type of priority to the SMS message, wherein the first type of priority is higher than a second type of priority assigned to other messages that do not include the one or more commands; and
a device communication service configured to send the SMS message to the mobile device via a wireless network, wherein the command code is recognizable to a listener component on the mobile device to perform an action on the mobile device.

17. The system of claim 16, further comprising:
a user interface backend coupled to the server, wherein the user interface backend is configured to send a message to the SMS service when a policy is designated to be pushed to mobile devices immediately.

18. The system of claim 16, wherein the SMS message includes a plain-text prefix that is human-readable for display on the mobile device.

19. The system of claim 16, wherein the server is further configured for:
setting information in a database, the information including an item that indicates the command is to be performed on the mobile device, wherein the command is selected based on the information in the database.

* * * * *